United States Patent
Moriya et al.

(10) Patent No.: US 12,340,813 B2
(45) Date of Patent: Jun. 24, 2025

(54) SOUND SIGNAL RECEIVING AND DECODING METHOD, SOUND SIGNAL DECODING METHOD, SOUND SIGNAL RECEIVING SIDE APPARATUS, DECODING APPARATUS, PROGRAM AND STORAGE MEDIUM

(71) Applicant: NIPPON TELEGRAPH AND TELEPHONE CORPORATION, Tokyo (JP)

(72) Inventors: Takehiro Moriya, Tokyo (JP); Yutaka Kamamoto, Tokyo (JP); Ryosuke Sugiura, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 834 days.

(21) Appl. No.: 17/617,840

(22) PCT Filed: Dec. 27, 2019

(86) PCT No.: PCT/JP2019/051596
§ 371 (c)(1),
(2) Date: Dec. 9, 2021

(87) PCT Pub. No.: WO2020/250471
PCT Pub. Date: Dec. 17, 2020

(65) Prior Publication Data
US 2022/0246157 A1    Aug. 4, 2022

(30) Foreign Application Priority Data

Jun. 13, 2019 (WO) .................. PCT/JP2019/023424

(51) Int. Cl.
*G10L 19/008* (2013.01)
*G10L 19/16* (2013.01)
*G10L 21/038* (2013.01)

(52) U.S. Cl.
CPC .......... *G10L 19/008* (2013.01); *G10L 19/167* (2013.01); *G10L 21/038* (2013.01)

(58) Field of Classification Search
CPC .... G10L 19/008; G10L 19/167; G10L 21/038
(Continued)

(56) References Cited

U.S. PATENT DOCUMENTS

2008/0010072 A1* 1/2008 Yoshida ................ G10L 19/008
704/E19.044
2010/0241434 A1* 9/2010 Ono ..................... G10L 19/008
704/500
2017/0330584 A1* 11/2017 Kamino ................ G10L 21/038

FOREIGN PATENT DOCUMENTS

JP    2005117132 A    4/2005
WO    2006070751 A1    7/2006
(Continued)

OTHER PUBLICATIONS

Richard Chia Tung Lee; Mao-Ching Chiu; Jung-Shan Lin, "Source Coding and Channel Coding," in Communications Engineering: Essentials for Computer Scientists and Electrical Engineers , IEEE, 2007, pp. 231-251, doi: 10.1109/9780470547168.ch8. (Year: 2007).*
(Continued)

*Primary Examiner* — Bharatkumar S Shah

(57) ABSTRACT

Provided is a technique according to which it is possible to obtain a decoded sound signal of high sound quality without significantly increasing the delay time compared to a configuration in which only a decoded sound signal of the minimum necessary sound quality is obtained. In a terminal apparatus connected to a first communication line and a second communication line with a lower priority level there
(Continued)

than, sound signals of multiple channels are obtained and output based on a monaural code included in a first code string input from the first communication line and an extended code included in a second code string with the closest frame number to that of the monaural code among extended codes included in the second code string input from the second communication line.

24 Claims, 14 Drawing Sheets

(58) Field of Classification Search
USPC .......................................................... 704/200
See application file for complete search history.

(56) References Cited

FOREIGN PATENT DOCUMENTS

| | | |
|---|---|---|
| WO | 2008102527 A1 | 8/2008 |
| WO | 2009129822 A1 | 10/2009 |

OTHER PUBLICATIONS

International Standard (2006) "Information technology—Generic coding of moving pictures and associated audio information—Part 7: Advanced Audio Coding (AAC)" ISO/IEC 13818-7:2006(E), Fourth edition, Jan. 15, 2006.
Unknown Author (2019) "Packet Loss Concealment" Wikipedia [online] Accessed on May 25, 2023, website: https://en.wikipedia.org/w/index.php?title=Packet_loss_concealment&oldid=887750308.

* cited by examiner

SOUND SIGNAL RECEIVING AND DECODING METHOD, SOUND SIGNAL DECODING METHOD, SOUND SIGNAL RECEIVING SIDE APPARATUS, DECODING APPARATUS, PROGRAM AND STORAGE MEDIUM

CROSS-REFERENCE TO RELATED APPLICATIONS

This application is a U.S. National Stage Application filed under 35 U.S.C. § 371 claiming priority to International Patent Application No. PCT/JP2019/051596, filed on 27 Dec. 2019, which application claims priority to and the benefit of International Patent Application No. PCT/JP2019/023424, filed on 13 Jun. 2019, the disclosures of which are hereby incorporated herein by reference in their entireties.

TECHNICAL FIELD

The present invention relates to at least one of a sound signal decoding technique for a terminal apparatus connected to at least two communication networks with different information transmission priority levels, and a sound signal encoding technique corresponding thereto.

BACKGROUND ART

Examples of prior techniques for encoding and decoding sound signals between terminal apparatuses connected to two communication networks with different information transmission priority levels include the technique disclosed in PTL 1. The encoding apparatus of PTL 1 performs scalable encoding on an input sound signal for each predetermined time segment, that is, for each frame, to obtain a low-band code 1, which is a code of a base layer, a low-band code 2, which is a code of an extension layer, and a high-band code, includes the low-band code 1 in a packet with a high priority level and at least transmits the resulting packet to a band-guaranteed network B, and includes the low-band code 2 and the high-band code in a packet with a low priority degree and transmits the resulting packet to a network A that has not been band-guaranteed. The decoding apparatus of PTL 1 starts monitoring the elapse of a time limit when a packet with a high priority level is received, and upon the elapse of the time limit, the decoding apparatus performs decoding using the received packet at that time. That is, based on the fact that delay is normally greater in the network A than in the network B, if the low-band code 2 and the high-band code have both arrived after the above-described time limit starting from the arrival of the code of the base layer, the decoding apparatus of PTL 1 substantially performs decoding processing using the low-band code 2 and the high-band code as well to obtain a decoded sound signal of high sound quality, and if the low-band code 2 and the high-band code have not arrived, the decoding apparatus performs decoding processing using only the low-band code 1 to obtain a decoded sound signal of the minimum necessary sound quality.

CITATION LIST

Patent Literature

[PTL 1] Japanese Patent Application Publication No. 2005-117132

SUMMARY OF THE INVENTION

Technical Problem

In the technique of PTL 1, in order to obtain a decoded sound signal of high sound quality in many frames, it is necessary to set an amount of time that is significantly longer than the delay time that occurs in the configuration in which only a decoded sound signal of the minimum necessary sound quality is obtained, as the above-described time limit. Accordingly, the technique of PTL 1 is problematic in that when an attempt is made to obtain decoded sound signals of high sound quality in many frames, the above-described time limit needs to be set so as to reach a delay time that is so long that a sense of discomfort occurs during a two-way conversation. Also, in the technique of PTL 1, if the time limit is brought to 0 to prevent a sense of discomfort from occurring during a two-way conversation, the percentage of frames for which packets with a high priority level have arrived within the time limit becomes very small. Accordingly, the technique of PTL 1 is problematic in that when the time limit is set so as to prevent a sense of discomfort from occurring during a two-way conversation, it is not possible to obtain decoded sound signals of high sound quality in most frames.

In view of this, the present invention aims to provide a technique according to which it is possible to obtain a decoded sound signal of high sound quality without dramatically increasing the delay time compared to a configuration in which only a decoded sound signal of the minimum necessary sound quality is obtained.

Means for Solving the Problem

An aspect of the present invention is a sound signal receiving and decoding method to be performed by a terminal apparatus connected to a first communication line and a second communication line with a lower priority level than the first communication line, the method including: a reception step of determining whether or not an average value, for a plurality of sets each composed of a first code string received from the first communication line and a second code string received from the second communication line corresponding to the first code string, of a difference between times at which the first code string and the second code string were received for each set is less than a predetermined time limit Tmin, if the average value is less than the time limit Tmin in the determination, for a frame after the determination, outputting a monaural code included in the first code string input from the first communication line and an extended code having the same frame number as the monaural code among extended codes included in the second code string input from the second communication line, and if the average value is not less than the time limit Tmin in the determination, for a frame after the determination, outputting the monaural code included in the first code string input from the first communication line and an extended code having the closest frame number to that of the monaural code among the extended codes included in the second code string input from the second communication line; and a decoding step of, for a frame after the determination, obtaining and outputting decoded digital sound signals of C (C being an integer that is at least 2) channels based on the monaural code output in the reception step and the extended code output in the reception step.

An aspect of the present invention is a sound signal receiving and decoding method to be performed by a terminal apparatus connected to a first communication line and a second communication line with a lower priority level than the first communication line, the method including: a reception step of determining whether or not an average value, for a plurality of sets each composed of a first code string received from the first communication line and a second code string received from the second communication line corresponding to the first code string, of a difference between times at which the first code string and the second code string were received for each set is less than a predetermined time limit Tmax, if the average value is less than the time limit Tmax in the determination, for a frame after the determination, outputting a monaural code included in the first code string input from the first communication line and an extended code having the closest frame number to that of the monaural code among extended codes included in the second code string input from the second communication line, and if the average value is not less than the time limit Tmax in the determination, for a frame after the determination, outputting the monaural code included in the first code string input from the first communication line; and a decoding step of, if the average value is less than the time limit Tmax in the determination, for a frame after the determination, obtaining and outputting decoded digital sound signals of C (C being an integer that is at least 2) channels based on the monaural code output in the reception step and the extended code output in the reception step, and if the average value is not less than the time limit Tmax in the determination, for a frame after the determination, outputting decoded digital sound signals obtained based on the monaural code output in the reception step as the decoded digital sound signals of C channels.

An aspect of the present invention is a sound signal receiving and decoding method to be performed by a terminal apparatus connected to a first communication line and a second communication line with a lower priority level than the first communication line, the method including: a reception step of determining whether an average value, for a plurality of sets each composed of a first code string received from the first communication line and a second code string received from the second communication line corresponding to the first code string, of a difference between times at which the first code string and the second code string were received for each set is less than a predetermined first time limit Tmin, is at least a predetermined second time limit Tmax that is greater than the first time limit Tmin, or is at least the first time limit Tmin and less than the second time limit Tmax, if the average value is less than the first time limit Tmin in the determination, for a frame after the determination, outputting a monaural code included in the first code string input from the first communication line and an extended code having the same frame number as the monaural code among extended codes included in the second code string input from the second communication line, if the average value is at least the first time limit Tmin and less than the second time limit Tmax in the determination, for a frame after the determination, outputting the monaural code included in the first code string input from the first communication line and an extended code with the closest frame number to that of the monaural code among the extended codes included in the second code string input from the second communication line, and if the average value is at least the second time limit Tmax in the determination, for a frame after the determination, outputting the monaural code included in the first code string input from the first communication line; and a decoding step of, if the average value is less than the first time limit Tmin in the determination, or if the average value is at least the first time limit Tmin and less than the second time limit Tmax in the determination, for a frame after the determination, obtaining and outputting decoded digital sound signals of C (C being an integer that is at least 2) channels based on the monaural code output in the reception step and the extended code output in the reception step, and if the average value is at least the second time limit Tmax in the determination, for a frame after the determination, outputting decoded digital sound signals obtained based on the monaural code output in the reception step as the decoded digital sound signals of C channels.

An aspect of the present invention is a sound signal receiving and decoding method to be performed by a terminal apparatus connected to a first communication line and a second communication line with a lower priority level than the first communication line, the method including: a reception step of, for a frame in which a difference in frame number between a monaural code included in a first code string input from the first communication line and an extended code with the closest frame number to that of the monaural code among extended codes included in a second code string input from the second communication line is less than a predetermined value, outputting the monaural code included in the first code string input from the first communication line and the extended code with the closest frame number to that of the monaural code among the extended codes included in the second code string input from the second communication line, and for a frame in which the difference is not less than the predetermined value, outputting the monaural code included in the first code string input from the first communication line; and a decoding step of, for a frame in which the difference is less than the predetermined value, obtaining and outputting decoded digital sound signals of C (C being an integer that is at least 2) channels based on the monaural code output in the reception step and the extended code output in the reception step, and for a frame in which the difference is not less than the predetermined value, outputting decoded digital sound signals obtained based on the monaural code output in the reception step as the decoded digital sound signals of C channels.

An aspect of the present invention is a sound signal decoding method to be performed by a terminal apparatus connected to a first communication line and a second communication line with a lower priority level than the first communication line, the method including: a decoding step of, if an average value, for a plurality of sets each composed of a first code string received from the first communication line and a second code string received from the second communication line corresponding to the first code string, of a difference between times at which the first code string and the second code string were received for each set is less than a predetermined time limit Tmin, obtaining and outputting decoded digital sound signals of C (C being an integer that is at least 2) channels based on a monaural code included in the first code string input from the first communication line and an extended code that is included in the second code string input from the second communication line and has the same frame number as the monaural code, and if the average value is not less than the time limit Tmin, obtaining and outputting the decoded digital sound signals of C channels based on the monaural code included in the first code string input from the first communication line and an extended code that is included in the second code string input from the second communication line and has the closest frame number to that of the monaural code.

An aspect of the present invention is a sound signal decoding method to be performed by a terminal apparatus connected to a first communication line and a second communication line with a lower priority level than the first communication line, the method including: a decoding step of, if an average value, for a plurality of sets each composed of a first code string received from the first communication line and a second code string received from the second communication line corresponding to the first code string, of a difference between times at which the first code string and the second code string were received for each set is less than a predetermined time limit Tmax, obtaining and outputting decoded digital sound signals of C (C being an integer that is at least 2) channels based on a monaural code included in the first code string input from the first communication line and an extended code that is included in the second code string input from the second communication line and has the closest frame number to that of the monaural code, and if the average value is not less than the time limit Tmax, outputting decoded digital sound signals obtained based on the monaural code included in the first code string input from the first communication line as the decoded digital sound signals of C channels.

An aspect of the present invention is a sound signal decoding method to be performed by a terminal apparatus connected to a first communication line and a second communication line with a lower priority level than the first communication line, the method including: a decoding step of, if an average value, for a plurality of sets each composed of a first code string received from the first communication line and a second code string received from the second communication line corresponding to the first code string, of a difference between times at which the first code string and the second code string were received for each set is less than a predetermined first time limit Tmin, obtaining and outputting decoded digital sound signals of C (C being an integer that is at least 2) channels based on a monaural code included in the first code string input from the first communication line and an extended code that is included in the second code string input from the second communication line and has the same frame number as the monaural code, if the average value is at least a predetermined second time limit Tmax that is greater than the first time limit Tmin, outputting decoded digital sound signals obtained based on the monaural code included in the first code string input from the first communication line as the decoded digital sound signals of C channels, and if the average value is at least the first time limit Tmin and less than the second time limit Tmax, obtaining and outputting the decoded digital sound signals of C channels based on the monaural code included in the first code string input from the first communication line and an extended code that is included in the second code string input from the second communication line and has the closest frame number to that of the monaural code.

An aspect of the present invention is a sound signal decoding method to be performed by a terminal apparatus connected to a first communication line and a second communication line with a lower priority level than the first communication line, the method including: a decoding step of, for a frame in which a difference in frame number between a monaural code included in a first code string input from the first communication line and an extended code that is included in a second code string input from the second communication line and has the closest frame number to that of the monaural code is less than a predetermined value, obtaining and outputting decoded digital sound signals of C (C being an integer that is at least 2) channels based on the monaural code and the extended code, and for a frame in which the difference is not less than the predetermined value, outputting decoded digital sound signals obtained based on the monaural code as the decoded digital sound signals of C channels.

Effects of the Invention

According to the present invention, it is possible to obtain a decoded sound signal of high sound quality without dramatically increasing the delay time compared to a configuration in which only a decoded sound signal of the minimum necessary sound quality is obtained.

DESCRIPTION OF EMBODIMENTS

Telephone System 100

Figure 1:
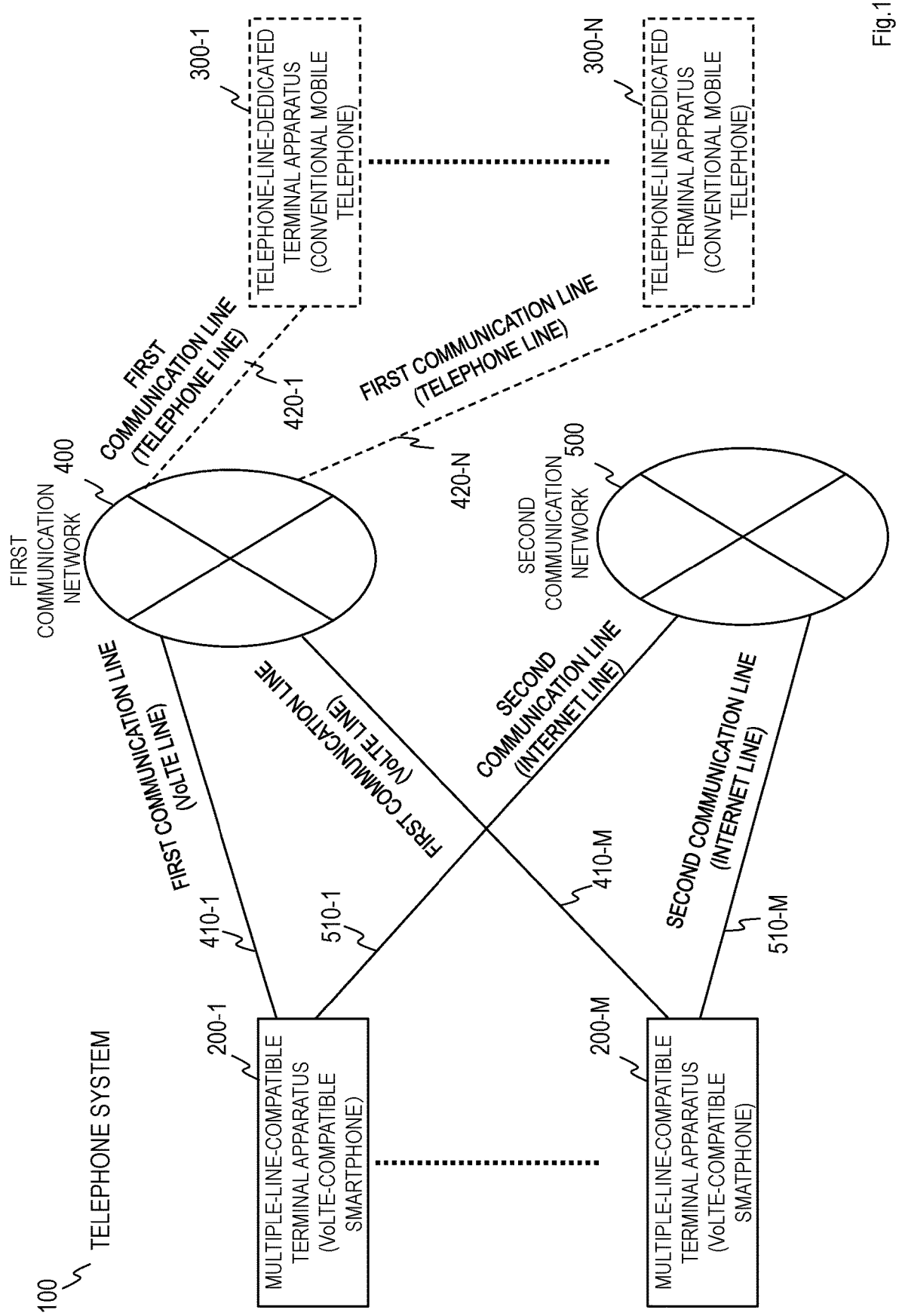
FIG. 1 is a block diagram showing an example of a telephone system.

As shown in FIG. 1, the telephone system 100 includes a multiple-line-compatible terminal apparatus 200-*m* (m being an integer that is at least 1 and at most M, and M being an integer that is at least 2), a first communication network 400, and a second communication network 500. As indicated by the broken lines in FIG. 1, the telephone system 100 may also include a telephone-line-dedicated terminal apparatus 300-*n* (n being an integer that is at least 1 and at most N, and N being an integer that is at least 1). Each multiple-line-compatible terminal apparatus 200-*m* can connect to another terminal apparatus via a first communication line 410-*m*, which is a communication line of the first communication network 400. Furthermore, each multiple-line-compatible terminal apparatus 200-*m* can connect to another multiple-line-compatible terminal apparatus via a second communication line 510-*m*, which is a communication line of the second communication network 500. Each telephone-line-dedicated terminal apparatus 300-*n* can connect to another terminal apparatus via a first communication line 420-*n*, which is a communication line of the first communication network 400.

First Communication Network 400, Second Communication Network 500

The first communication network 400 and the second communication network 500 are communication networks with different information transmission priority levels. The first communication network 400 is a communication network with a higher information transmission priority level than the second communication network 500, and is a communication network that enables a code string of a predetermined bit rate to be transmitted with a short delay time from a certain terminal apparatus to another terminal apparatus. The first communication network 400 is, for example, a communication network that is to be used for a two-way conversation between a terminal apparatus, which is a conventional mobile telephone or smartphone, and another terminal apparatus, which is a conventional mobile telephone or smartphone, and is a communication network that includes a communication line that is generally called a telephone line. The second communication network 500 is a communication network with a lower information transmission priority level than the first communication network 400, and is a communication network that enables the code string to be transmitted from a certain terminal apparatus to another terminal apparatus without providing a limit on the delay time. The second communication network 500 is, for example, a communication network that is to be used when data such as an image or a character string is transmitted from a terminal apparatus, which is a smartphone, to another terminal apparatus, which is a smartphone, and is a communication network that includes a communication line that is generally called an Internet line.

Although the first communication network 400 and the second communication network 500 are shown divided in FIG. 1, the first communication network 400 and the second communication network 500 do not need to be physically divided, and need only be logically divided. Similarly, if terminal devices are connected to both the first communication line 410-*m* and the second communication line 510-*m*, the first communication line 410-*m* and the second communication line 510-*m* do not need to be physically divided, and need only be logically divided. That is, each terminal apparatus may be connected to one IP communication network by one IP communication line, and a first communication network 400 and a first communication line 410-*m*, which are a communication network and a communication line with a high information transmission priority level, and a second communication network 500 and a second communication line 510-*m*, which are a communication network and a communication line with a lower information transmission priority level than the first communication network 400 and the first communication line 410-*m*, may also be logically constructed through packet priority control or the like. For example, the multiple-line-compatible terminal apparatus 200-*m* may be a smartphone that supports VoLTE (Voice over LIE, Voice over Long Term Evolution), examples of the first communication network 400 and the first communication line 410-*m* may be a VoLTE communication network and a VoLTE line in an LTE communication network and an LTE line, and examples of the second communication network 500 and the second communication line 510-*m* may be an Internet communication network and an Internet line in an LTE communication network and an LTE line.

Note that the above-described examples of the communication networks, communication lines, and terminal apparatuses are all for mobile communication, but there is no limitation to the communication networks being for fixed communication or mobile communication, the communication lines being wired or wireless, the terminal apparatuses being fixed telephones or mobile telephones, and the like.

First Embodiment

A multiple-line-compatible terminal apparatus of a first embodiment will be described.

Multiple-Line-Compatible Terminal Apparatus 200-*m*

Figure 2:
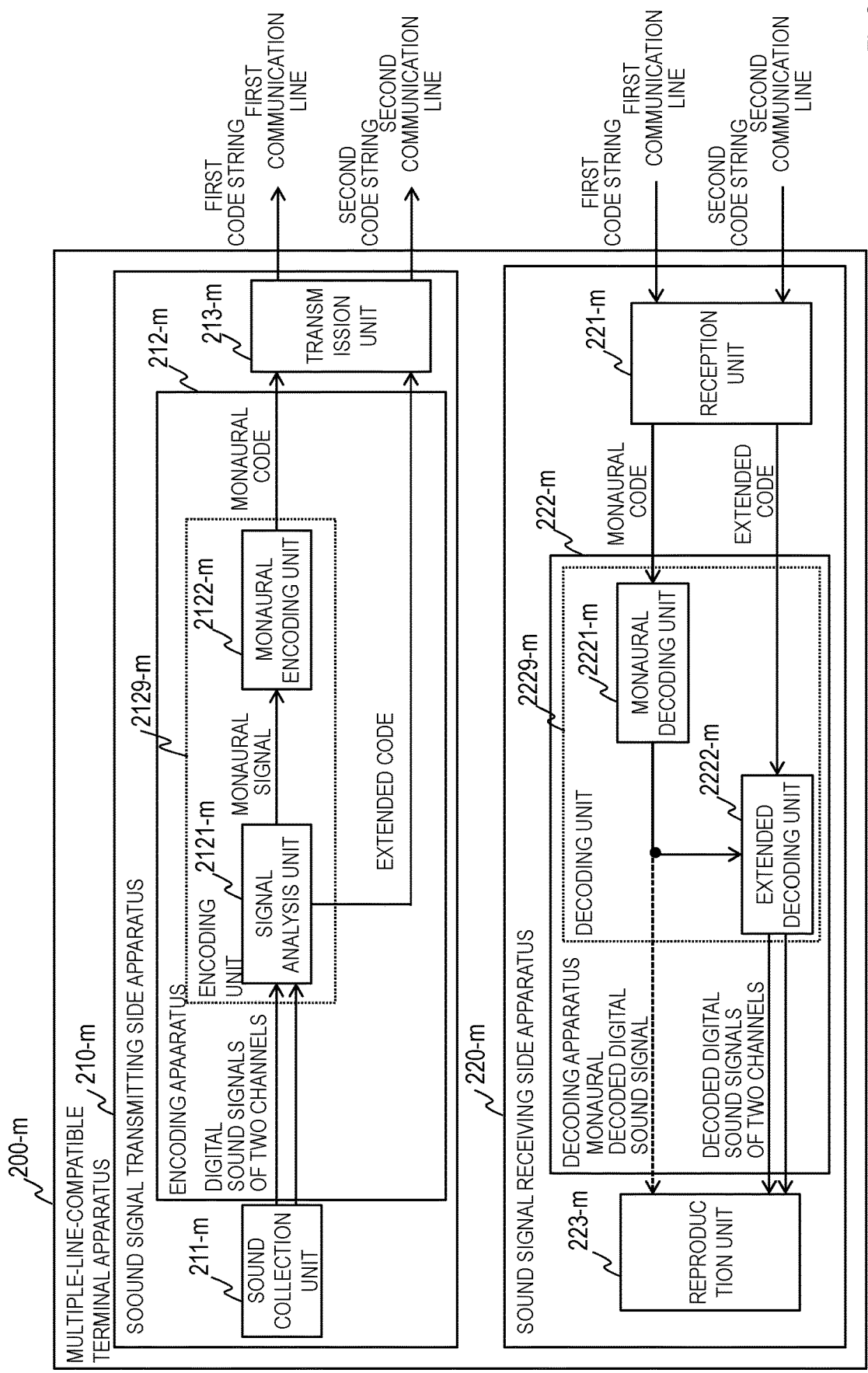
FIG. 2 is a block diagram showing an example of a multiple-line-compatible terminal apparatus.
Figure 3:
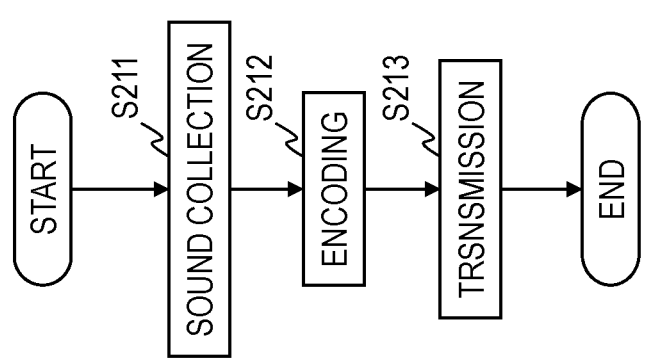
FIG. 3 is a flowchart showing an example of processing of a sound signal transmitting side apparatus of a multiple-line-compatible terminal apparatus.
Figure 4:
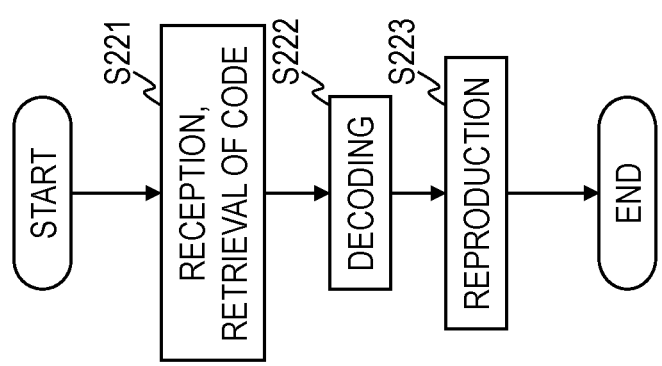
FIG. 4 is a flowchart showing an example of processing of a sound signal receiving side apparatus of a multiple-line-compatible terminal apparatus.

The multiple-line-compatible terminal apparatus 200-*m* is, for example, a smartphone that supports VoLTE, and as shown in FIG. 2, includes a sound signal transmitting side apparatus 210-*m* and a sound signal receiving side apparatus 220-*m*. The sound signal transmitting side apparatus 210-*m* includes a sound collection unit 211-*m*, an encoding apparatus 212-*m*, and a transmission unit 213-*m*. The sound signal receiving side apparatus 220-*m* includes a reception unit 221-*m*, a decoding apparatus 222-*m*, and a reproduction unit 223-*m*. The encoding apparatus 212-*m* includes a signal analysis unit 2121-*m*, and a monaural encoding unit 2122-*m*. The decoding apparatus 222-*m* includes a monaural decoding unit 2221-*m* and an extended decoding unit 2222-*m*. Note that as illustrated by the dotted line, the signal analysis unit 2121-*m* and the monaural encoding unit 2122-*m* are collectively referred to as an encoding unit 2129-*m*, and the monaural decoding unit 2221-*m* and the extended decoding unit 2222-*m* are collectively referred to as a decoding unit 2229-*m*. Also, the encoding apparatus 212-*m* and the decoding apparatus 222-*m* are referred to as a sound signal encoding apparatus 212-*m* and a sound signal decoding apparatus 222-*m* respectively in some cases as well. The sound signal transmitting side apparatus 210-*m* of the multiple-line-compatible terminal apparatus 200-*m* performs the processing of steps S211 to S213, which are illustrated in FIG. 3 and in the description below, and the sound signal receiving side apparatus 220-*m* of the multiple-line-compatible terminal apparatus 200-*m* performs the processing of steps S221 to S223, which are illustrated in FIG. 4 and in the description below.

Sound Signal Transmitting Side Apparatus 210-*m*

For example, for each predetermined time segment of 20 ms, that is, for each frame, the sound signal transmitting side apparatus 210-*m* obtains a first code string, which is a code string that includes a monaural code corresponding to digital sound signals of two channels, and outputs the obtained first code string to the first communication line 410-*m*, and obtains a second code string, which is a code string that includes an extended code corresponding to digital sound signals of two channels, and outputs the obtained second code string to the second communication line 510-*m*.

Sound Collection Unit 211-*m*

The sound collection unit 211-*m* includes two microphones and two AD conversion units. The microphones and AD conversion units are associated with each other in one-to-one relationships. The microphone collects sound generated in the spatial region of the surrounding area of the microphone, converts the sound into an analog electrical signal, and outputs the analog electrical signal to the AD conversion unit. The AD conversion unit converts the input analog electrical signal into, for example, a digital sound signal, which is a PCM signal with a sampling frequency of 8 kHz, and outputs the result. That is, the sound collection unit 211-*m* outputs digital sound signals of two channels corresponding to sounds collected by two microphones, or for example, two-channel stereo digital sound signals of a left channel and a right channel, to the encoding apparatus 212-*m* (step S211).

Note that all or a portion of the sound collection unit 211-*m* may be connected to the sound signal transmitting side apparatus 210-*m* without being included inside of the sound signal transmitting side apparatus 210-*m*. For example, the sound collection unit 211-*m* of the sound signal transmitting side apparatus 210-*m* may also not include microphones, and two analog electrical signals may also be input from the microphones connected to the sound signal transmitting side apparatus 210-*m* to the AD conversion units of the sound collection unit 211-*m* of the sound signal transmitting side apparatus 210-*m*. Alternatively, the sound signal transmitting side apparatus 210-*m* may also not include the sound collection unit 211-*m*, and digital sound signals of two channels may also be input from a sound collection device such as an AD converter connected to the sound signal transmitting side apparatus 210-*m* to the encoding apparatus 212-*m* of the sound signal transmitting side apparatus 210-*m*.

Encoding Apparatus 212-*m*

The encoding apparatus 212-*m* receives input of the digital sound signals of two channels from the sound collection unit 211-*m* or a sound collection device connected to the sound signal transmitting side apparatus 210-*m*. For each frame, the encoding apparatus 212-*m* obtains a monaural code and an extended code corresponding to the input digital sound signals of two channels and outputs the monaural code and the extended code to the transmission unit 213-*m* (step S212).

Signal Analysis Unit 2121-*m*

For each frame, based on the input digital sound signals of two channels, the signal analysis unit 2121-*m* obtains a monaural signal, which is a signal obtained by mixing the input digital sound signals of two channels, and an extended code indicating a feature parameter, which is a parameter that indicates a feature of a difference between the input digital sound signals of two channels and has little temporal variation. The signal analysis unit 2121-*m* outputs the obtained monaural signal to the monaural encoding unit 2122-*m* and outputs the obtained extended code to the transmission unit 213-*m*. A parameter with little temporal variation is a parameter that has low dependence on the time and has low time resolution.

First Example of Signal Analysis Unit 2121-*m*

As a first example, operations performed for each frame by the signal analysis unit 2121-*m* in a case in which information indicating a time difference between the input digital sound signals of two channels is used as the feature parameter will be described. The signal analysis unit 2121-*m* first obtains the feature parameter, which is information indicating a time difference between the input digital sound signals of two channels (step S2121-11). The time difference between the input digital sound signals of two channels may be obtained using any known method. For example, for a candidate sample count of each time difference within a predetermined range, the signal analysis unit 2121-*m* calculates a correlation value between a sample string of a digital sound signal of one channel (first channel) and a sample string obtained by advancing a sample string of a digital sound signal of another channel (second channel) by the candidate sample count, and obtains a time difference sample count, which is the candidate sample count at which the correlation value reaches its maximum, as the feature parameter.

Next, the signal analysis unit 2121-*m* obtains, as a monaural signal, which is a signal obtained by mixing digital sound signals of two channels, one of a series resulting from addition of corresponding samples of a sample string of a digital sound signal of a first channel and a sample string obtained by providing a time difference indicated by the feature parameter to the sample string of the digital sound signal of the second channel, a series resulting from average values of the corresponding samples, and a series obtained by modifying the series resulting from addition or average values (step S2121-12). A sample string obtained by providing the time difference indicated by the feature parameter to the sample string of the digital sound signal of the second channel is, for example, a sample string obtained by advancing the sample string of the digital sound signal of the second channel by the time difference sample count indicated by the feature parameter.

The signal analysis unit 2121-*m* further obtains an extended code, which is a code indicating the feature parameter (step S2121-13). The extended code, which is a code indicating a feature parameter, need only be obtained using a known method. For example, the signal analysis unit 2121-*m* performs scalar quantization on the time difference sample count of the input digital sound signals of two channels to obtain a code, and outputs the obtained code as the extended code. Alternatively, for example, the signal analysis unit 2121-*m* outputs a binary number indicating the time difference sample count of the input digital sound signals of two channels itself as the extended code.

Second Example of Signal Analysis Unit 2121-*m*

As a second example, operations performed for each frame by the signal analysis unit 2121-*m* in a case in which information indicating an intensity difference for each frequency band of the input digital sound signals of two channels is used as the feature parameter will be described. Note that in the following description, a specific example using a complex DFT (Discrete Fourier Transformation) will be described, but a method for converting into a known frequency region other than a complex DFT may also be used.

First, the signal analysis unit 2121-$m$ obtains a complex DFT coefficient string by subjecting the respective input digital sound signals of two channels to a complex DFT (step S2121-21). The complex DFT coefficient string may also be obtained using a known method such as processing for applying overlapping windows between frames, and processing performed with consideration given to the symmetry of a complex number obtained through complex DFT. For example, if a frame is constituted by 128 samples, it is sufficient to obtain, as the complex DFT coefficient string, a series constituted by 128 complex numbers, which is the front half of a series constituted by 256 complex numbers obtained by performing complex DFT on a sample string of 256 continuous digital sound signals that include the final 64 samples of the immediately-previous frame and the first 64 samples of the immediately-subsequent frame. In the following description, f is an integer that is at least 1 and at most 128, V1(f) is a complex DFT coefficient of a complex DFT coefficient string of a first channel, and V2(f) is a complex DFT coefficient of a complex DFT coefficient string of a second channel Next, the signal analysis unit 2121-$m$ obtains a series composed of values of radii on a complex plane of complex DFT coefficients, based on the complex DFT coefficient strings of the two channels (step S2121-22). The value of a radius on a complex plane of each complex DFT coefficient of each channel corresponds to the intensity of each frequency bin of the digital sound signal of each channel Hereinafter, V1r(f) is the value of a radius on a complex plane of a complex DFT coefficient V1(f) of the first channel, and V2r(f) is the value of a radius on a complex plane of the complex DFT coefficient V2(f) of the second channel Next, the signal analysis unit 2121-$m$ obtains the average value of ratios between the values of the radii of one channel and the values of the radii of another channel for each frequency band, and obtains a series composed of average values as a feature parameter (step S2121-23). This series composed of average values is a feature parameter that corresponds to information indicating an intensity difference for each frequency band of the input digital sound signals of two channels. For example, if four bands are used, average values Mr(1), Mr(2), Mr(3), and Mr(4) of 32 values obtained by dividing the value V1r(f) of the radius of the first channel for each of the four regions in which f is 1 to 32, 33 to 64, 65 to 96, and 97 to 128 by the value V2r(f) of the radius of the second channel are obtained, and the series of average values [Mr(1), Mr(2), Mr(3), and Mr(4)] is obtained as the feature parameter.

Note that the band count need only be a value that is at most the number of frequency bins, and it is also possible to use a value that is the same as the frequency bin count or 1 as the band count. If a value that is the same as the number of frequency bins is used as the band count, the signal analysis unit 2121-$m$ need only obtain the value of the ratio between the value of the radius of one channel of the frequency bin and the value of the radius of another channel, and obtain the series of the obtained values of ratios as the feature parameter. If 1 is used as the band count, the signal analysis unit 2121-$m$ need only obtain the value of the ratio between the value of the radius of one channel of the frequency bin and the value of the radius of another channel, and obtain the average value of the entire band of the obtained values of the ratios as the feature parameter. Also, the frequency bin count that is included in each frequency band in the case where there are multiple frequency bands is optional, and for example, the frequency bin count that is included in a band with a low frequency may be made smaller than the frequency bin count that is included in a band with a high frequency.

Also, the signal analysis unit 2121-$m$ may also use the difference between the value of the radius of one channel and the value of the radius of another channel instead of a ratio between the value of the radius of one channel and the value of the radius of another channel. That is, in the above-described example, a value obtained by subtracting the value V2r(f) of the radius of the second channel from the value V1r(f) of the radius of the first channel may also be used instead of a value obtained by dividing the value V1r(f) of the radius of the first channel by the value V2r(f) of the radius of the second channel.

The signal analysis unit 2121-$m$ also obtains, as a monaural signal, which is a signal obtained by mixing the digital sound signals of two channels, one of a series obtained through addition of corresponding samples of a sample string of digital sound signals of a first channel and a sample string of digital sound signals of a second channel, a series of average values of the corresponding samples, and a series obtained by modifying the series obtained through addition or average values (step S2121-24). Note that the signal analysis unit 2121-$m$ may also obtain the average value VMr(f) of the radii of the complex DFT coefficients V1(f) of the complex DFT coefficient string of the first channel obtained in step S2121-21 and the complex DFT coefficients V2(f) of the complex DFT coefficient string of the second channel, and the average value VMθ(f) of angles of them, perform inverse complex DFT on a series of complex numbers VM(f), in which the radius on a complex plane is VMr(f) and the angle is VMθ(f), and obtain a monaural signal, which is a signal obtained by mixing the digital sound signals of two channels (step S2121-24').

The signal analysis unit 2121-$m$ further obtains an extended code, which is a code indicating the feature parameter (step S2121-25). The extended code, which is a code indicating the feature parameter, need only be obtained using a known method. For example, the signal analysis unit 2121-$m$ performs vector quantization on the series of values obtained in step S2121-23 to obtain a code, and outputs the obtained code as the extended code. Alternatively, for example, the signal analysis unit 2121-$m$ performs scalar quantization on the values included in the series of values obtained in step S2121-23 to obtain a code, combines the obtained codes, and outputs the result as the extended code. Note that if one value was obtained in step S2121-23, the signal analysis unit 2121-$m$ need only output a code obtained by performing scalar quantization on that one value as the extended code.

The time difference between the input digital sound signals of two channels described in the first example of the signal analysis unit 2121-$m$ and the intensity difference for each frequency band of the input digital sound signals of two channels described in the second example of the signal analysis unit 2121-$m$ depend on the position of the sound source. If a general sound source such as a person or a musical instrument is used, the position of the sound source does not change much over time and the time difference of the input digital sound signals of two channels and the intensity difference for each frequency band do not change much as long as the sound source does not move suddenly, even if the position of the sound source changes over time.

Accordingly, the signal analysis unit 2121-$m$ may also obtain, as the feature parameter, the average or weighted average of the feature parameters obtained based on the input digital sound signals of two channels of each frame for multiple continuous frames including frames being processed, and output the extended code indicating the obtained feature parameter. The weight to be used in the weighted average need only be the largest value for the frame being processed, and a value that is smaller the farther the frame is from the frame being processed. Note that if the feature parameter of a future frame is used by the frame being processed, preloading will be necessary and delay will increase, and therefore it is preferable that the signal analysis unit 2121-$m$ uses multiple past continuous frames that include the frame being processed. Note that naturally, if multiple elements are included in the feature parameter as with information indicating the intensity difference for each of the multiple frequency bands, the average or weighted average of the feature parameter is a numeric value string in which the average value or weighted average value for each element of the feature parameter is an element.

Note that, since, for example, a sample string of differences between waveforms of the input digital sound signals of two channels, that is, a sample string of the differences between corresponding samples of the input digital sound signals of two channels, is a sample string that is completely different from the differences between waveforms of the input digital sound signals of two channels even if the time of each sample is merely shifted by one sample, it is information that is highly dependent on the time, information with a high temporal resolution, and information with large temporal variation. Similarly, a phase difference between the input digital sound signals of two channels, for example, a difference between an angle on a complex plane of each complex DFT coefficient V1(f) of the complex DFT coefficient string of the first channel obtained in step S2121-21 and an angle on a complex plane of each complex DFT coefficient V2(f) of the complex DFT coefficient string of the second channel is information that is highly dependent on the time, information with a high temporal resolution, and information with large temporal variation.

That is, the feature parameter indicated by the extended code obtained by the signal analysis unit 2121-$m$ is not a parameter indicating information that depends on the waveform of the sound signal of the sound emitted by the sound source among the differences between the input digital sound signals of two channels, such as the difference between waveforms of the input digital sound signals of two channels, illustrated just before, or the phase difference between the input digital sound signals of two channels, but it is a parameter indicating information that depends on the relative positions in space of the sound source and the microphones among the differences between the input digital sound signals of two channels, such as the time difference between the input digital sound signals of two channels shown in the first example of the signal analysis unit 2121-$m$ or the intensity difference for each frequency band of the input digital sound signals of two channels shown in the second example of the signal analysis unit 2121-$m$. In short, the feature parameter indicated by the extended code obtained by the signal analysis unit 2121-$m$ can also be called a parameter that indicates a feature of a difference between the input digital sound signals of two channels and has a low temporal resolution, the feature parameter can also be called a parameter that indicates a feature of a difference between the input digital sound signals of two channels and has little temporal variation, the feature parameter can also be called a parameter that indicates a feature of a difference between the input digital sound signals of two channels and has low dependency on the time, and the feature parameter can also be called a parameter that indicates a feature of a difference between the input digital sound signals of two channels and depends on the relative positions in space of the sound source and the microphones.

Monaural Encoding Unit 2122-$m$

For each frame, the monaural encoding unit 2122-$m$ encodes an input monaural signal using a predetermined encoding scheme to obtain a monaural code, and outputs the monaural code to the transmission unit 213-$m$. As the predetermined encoding scheme, it is necessary to use an encoding scheme in which the bit rate of the monaural code is at most the communication capacity of the first communication line 410-$m$, for example, a scheme for encoding telephone band audio for mobile telephone use such as a 13.2 kbps mode of a 3GPP EVS standard (3GPPTS26.442).

That is, for each frame, the encoding apparatus 212-$m$ obtains a monaural code indicating a signal obtained by mixing the input digital sound signals of two channels and an extended code indicating a feature parameter, which is a parameter indicating a feature of a difference between channels of the input digital sound signals of two channels and is a parameter indicating a low time resolution. Note that as will be described later, the monaural code obtained by the encoding apparatus 212-$m$ is a code that is output to the first communication line in a state of being included in a first code string, and the extended code obtained by the encoding apparatus 212-$m$ is a code that is output to the second communication line in a state of being included in a second code string.

Note that the encoding apparatus 212-$m$ may also use a code indicating the average or the weighted average of the feature parameter obtained based on the digital sound signals of two channels of the current frame, which is the frame being processed, and the feature parameters obtained based on the digital sound signals of two channels of past frames relative to the current frame, which is being processed as the extended code.

Transmission Unit 213-$m$

For each frame, the transmission unit 213-$m$ outputs a first code string, which is a code string that includes a monaural code input from the encoding apparatus 221-$m$, to the first communication line 410-$m$, and outputs a second code string, which is a code string that includes an extended code input from the encoding apparatus 221-$m$, to the second communication line 510-$m$ (step S213).

The transmission unit 213-$m$ performs output such that it is possible to specify the frame of the monaural code included in the first code string. For example, the transmission unit 213-$m$ uses information by which the frame can be specified, such as the frame number or the time corresponding to the frame, as auxiliary information, and outputs the auxiliary information in a state of being included in the first code string. Similarly, the transmission unit 213-$m$ performs output such that it is possible to specify the frame of the extended code included in the second code string. For example, the transmission unit 213-$m$ uses information by which the frame can be specified, such as the frame number or the time corresponding to the frame, as auxiliary information, and outputs the auxiliary information in a state of being included in the second code string. Note that in the sound signal receiving side apparatus 220-$m$ of the present first embodiment, and in the embodiments and modified examples below, an example will be described in which the frame number is included as the auxiliary information in the first code string and in the second code string.

Sound Signal Receiving Side Apparatus 220-*m*

For example, for each predetermined time segment of 20 ms, that is, for each frame, the sound signal receiving side apparatus 220-*m* outputs a sound obtained based on the monaural code included in the first code string input from the first communication line 410-*m* and the extended code included in the second code string input from the second communication line 510-*m*.

Reception Unit 221-*m*

For each frame, the reception unit 221-*m* outputs a monaural code included in the first code string input from the first communication line 410-*m* and an extended code with a frame number that is the closest to that of the monaural code among the extended codes included in the second code string input from the second communication line 510-*m* to the decoding apparatus 222-*m* (step S221).

Since the first communication line 410-*m* is a communication network with a high priority level that is used for a two-way conversation, the reception unit 221-*m* receives input of the first code string including the monaural code from the first communication line 410-*m* such that the reception unit 221-*m* can output the monaural code, output in frame number order by encoding apparatus 212-*m'* of the sound signal transmitting side apparatus 210-*m'* of the multiple-line-compatible terminal apparatus 200-*m'* (m' being an integer that is different from m and is at least 1 and at most M) that is at the conversation partner location, in the frame number order at a time interval of the frame length (i.e., for example, a predetermined time interval of 20 ms). Also, since the telephone system 100 aims to smoothly realize a two-way conversation, it is desirable that the reception unit 221-*m* outputs the code output by the encoding apparatus 212-*m'* of the sound signal transmitting side apparatus 210-*m'* that is at the conversation partner location with as low a delay as possible to the decoding apparatus 222-*m*. In view of this, the reception unit 221-*m* outputs the monaural code included in the first code string output by the sound signal transmitting side apparatus 210-*m'* that is at the conversation partner location in the frame number order output by the sound signal transmitting side apparatus 210-*m'* that is at the conversation partner location at the time interval of the frame length to the decoding apparatus 222-*m*, regardless of whether or not the second code string including the extended code of the same frame number as the monaural code has been input to the reception unit 221-*m*.

Since the second communication line 510-*m* is a communication network with a low priority level, normally, the reception unit 221-*m* receives input of the second code string of a given frame output by the sound signal transmitting side apparatus 210-*m'* that is at the conversation partner location from the second communication line 510-*m* after the first code string of the frame is input from the first communication line 410-*m*. That is, at the time at which the reception unit 221-*m* outputs the monaural code to the decoding apparatus 222-*m*, normally, the second code string including the extended code of the same frame number as the monaural code has not been input to the reception unit 221-*m*, and the extended code of the same frame number as the monaural code cannot be output to the decoding apparatus 222-*m*. Also, since the second communication line 510-*m* is a communication network with a low priority level, the second code strings of the frames output by the sound signal transmitting side apparatus 210-*m'* that is at the conversation partner location are not necessarily input from the second communication line 510-*m* in frame number order. Of course, depending on the state of the second communication network 500, if, for example, the second communication network 500 is empty or the like, it is also possible that the reception unit 221-*m* receives input of the second code string of a given frame output by the sound signal transmitting side apparatus 210-*m'* that is at the conversation partner location from the second communication line 510-*m* at the same time as or before the first code string of the frame is input from the first communication line 410-*m*. That is, there are also cases where the second code string including the extended code of the same frame number as the monaural code has been input to the reception unit 221-*m* at the time when the reception unit 221-*m* outputs the monaural code to the decoding apparatus 222-*m* and the extended code of the same frame number as the monaural code can be output to the decoding apparatus 222-*m*. In view of this, for each frame, the reception unit 221-*m* outputs the extended code with the closest frame number to that of the monaural code to be output to the decoding apparatus 222-*m* among the extended codes included in the second code string input from the second communication line 510-*m* to the decoding apparatus 222-*m* instead of the extended code of the same frame number as the monaural code to be output to the decoding apparatus 222-*m* among the extended codes included in the second code string input from the second communication line 510-*m*. In other words, for each frame, the reception unit 221-*m* outputs, to the decoding apparatus 222-*m*, the extended code included in the second code string with the closest frame number to that of the first code string in which the monaural code to be output to the decoding apparatus 222-*m* is included among the second code strings input from the second communication line 510-*m*.

Here, the extended code with the closest frame number to that of the monaural code to be output to the decoding apparatus 222-*m* among the extended codes included in the second code string input from the second communication line 510-*m* is an extended code with the same frame number as the monaural code to be output to the decoding apparatus 222-*m* among the extended codes included in the second code string input from the second communication line 510-*m* if an extended code with the same frame number as the monaural code to be output to the decoding apparatus 222-*m* is included in the extended codes included in the second code string input from the second communication line 510-*m*, and is the extended code with the closest frame number to that of the monaural code to be output to the decoding apparatus 222-*m* (i.e., an extended code that does not have the same frame number as the monaural code to be output to the decoding apparatus 222-*m* but has the closest frame number to that of the monaural code to be output to the decoding apparatus 222-*m* among the extended codes included in the second code string input from the second communication line 510-*m*) if the extended code with the same frame number as the monaural code to be output to the decoding apparatus 222-*m* is not included in the extended codes included in the second code string input from the second communication line 510-*m*. The same applies also to later-described embodiments and variations.

That is, for each frame, the reception unit 221-*m* outputs a monaural code that is included in the first code string input from the first communication line 410-*m* and an extended code that has the closest frame number to that of the monaural code among the extended codes included in the second code string input from the second communication line 510-$m$. Naturally, the reception unit 221-$m$ outputs the monaural codes in frame number order. More specifically, the reception unit 221-$m$ receives input of the first code string from the first communication line 410-$m$ and input of the second code string from the second communication line 510-$m$, for each frame, outputs a monaural code included in the first code string input from the first communication line 410-$m$ (i.e., monaural codes in frame number order), outputs an extended code with the same frame number as the monaural code if an extended code with the same frame number as the monaural code is included in the extended codes included in the second code string input from the second communication line 510-$m$, and outputs an extended code with a frame number that is the closest to that of the monaural code among the extended codes included in the second code string input from the second communication line (i.e., an extended code with a frame number that is different from that of the monaural code but is the closest to that of the monaural code among the extended codes included in the second code string input from the second communication line) if an extended code with the same frame number as the monaural code is not included in the extended codes included in the second code string input from the second communication line 510-$m$.

Note that the reception unit 221-$m$ is provided with a storage unit (not shown) that accumulates multiple frames'-worth of code strings received non-synchronously from each communication line due to communication including fluctuation, re-transmission control, and the like being performed, and the code string is not limited to being input at a predetermined time interval or in frame number order from each communication line to the reception unit 221-$m$, but the reception unit 221-$m$ can perform output as long as the code is included in the code string accumulated in the storage unit, although this is a known technique and therefore will not be described in detail. That is, the reception unit 221-$m$ receives input of and stores the first code string from the first communication line 410-$m$, stores the input first code string, and can output the stored first code string. Also, the reception unit 221-$m$ receives input of and stores the second code string from the second communication line 510-$m$, stores the input second code string, and can output the stored second code string. Accordingly, for each predetermined time segment, that is, for each frame, the reception unit 221-$m$ can retrieve a monaural code in frame order, and can retrieve an extended code with the closest frame number to that of the monaural code.

Decoding Apparatus 222-$m$

For each frame, the monaural code and the extended code output by the reception unit 221-$m$ are input to the decoding apparatus 222-$m$. For each frame, the decoding apparatus 222-$m$ obtains decoded digital sound signals of two channels corresponding to the input monaural code and extended code and outputs them to the reproduction unit 223-$m$ (step S222).

The monaural codes in frame number order that are included in the first code strings input in frame number order from the first communication line 410-$m$ and the extended codes that are included in the second code strings input from the second communication lines 510-$m$ and that have the closest frame numbers to those of the monaural codes are input to the decoding apparatus 222-$m$. That is, for each frame, the decoding apparatus 222-$m$ obtains and outputs decoded digital sound signals of two channels based on the monaural codes included in the first code strings input from the first communication line 410-$m$ and the extended codes that are included in the second code strings input from the second communication line 510-$m$ and have the closest frame number to that of the monaural codes. Note that naturally, the monaural codes used by the decoding apparatus 222-$m$ are in frame number order.

In other words, the monaural codes in frame number order that were output by the encoding apparatus 212-$m'$ of the sound signal transmitting side apparatus 210-$m'$ that at is the conversation partner location and the extended codes with the closest frame numbers to those of the monaural codes are input to the decoding apparatus 222-$m$. That is, for each frame, the decoding apparatus 222-$m$ obtains the decoded digital sound signals of two channels based on the monaural codes in frame number order that were output by the encoding apparatus 212-$m'$ of the sound signal transmitting side apparatus 210-$m'$ that is at the conversation partner location and the extended codes with the closest frame numbers to those of the monaural codes, and outputs them to the reproduction unit 223-$m$.

Here, in the case of a frame in which an extended code with the same frame number as that of the monaural code included in the first code string input from the first communication line 410-$m$ is included in the extended codes included in the second code string input from the second communication line 510-$m$, the extended code input to the decoding apparatus 222-$m$ is an extended code that is included in the second code string input from the second communication line 510-$m$ and has the same frame number as the monaural code of that frame, and in the case of a frame in which an extended code with the same frame number as the monaural code included in the first code string input from the first communication line 410-$m$ is not included in the extended codes included in the second code string input from the second communication line 510-$m$, the extended code input to the decoding apparatus 222-$m$ is an extended code that is included in the second code string input from the second communication line 510-$m$ and has the closest frame number to that of the monaural code of that frame (i.e., an extended code that has a different frame number from that of the monaural code of that frame but has the closest frame number to that of the monaural code of that frame). The same applies also to later-described embodiments and variations.

Accordingly, for each frame, if an extended code with the same frame number as the monaural code (i.e., the monaural code in frame number order) included in the first code string input from the first communication line 410-$m$ is included in the extended codes included in the second code string input from the second communication line 510-$m$, the decoding apparatus 222-$m$ obtains and outputs the decoded digital sound signals of two channels based on the monaural code included in the first code string input from the first communication line 410-$m$ (i.e., the monaural code in frame number order) and the extended code with the same frame number as the monaural code, and if no extended code with the same frame number as the monaural code (i.e., the monaural code in frame number order) included in the first code string input from the first communication line 410-$m$ is included in the extended codes included in the second code string input from the second communication line 510-$m$, the decoding apparatus 222-$m$ obtains and outputs the decoded digital sound signals of two channels based on the monaural code included in the first code string input from the first communication line 410-$m$ (i.e., the monaural code in frame number order) and an extended code that is included in the second code string input from the second communication line 510-*m* and has the closest frame number to that of the monaural code (i.e., an extended code that does not have the same frame number as the monaural code but has the closest frame number to that of the monaural code).

Monaural Decoding Unit 2221-*m*

For each frame, the monaural code that was input to the decoding apparatus 222-*m* is input to the monaural decoding unit 2221-*m*. For each frame, the monaural decoding unit 2221-*m* decodes the input monaural code using a predetermined decoding scheme to obtain a monaural decoded digital sound signal, and outputs the result to the extended decoding unit 2222-*m*. A decoding scheme corresponding to the encoding scheme used by the monaural encoding unit 2122-*m*' of the encoding apparatus 212-*m*' of the sound signal transmitting side apparatus 210-*m*' that is at the conversation partner location is used as the predetermined decoding scheme.

The monaural codes in frame number order that were output by the encoding apparatus 212-*m*' of the sound signal transmitting side apparatus 210-*m*' that is at the conversation partner location are input to the monaural decoding unit 2221-*m*. That is, for each frame, the monaural decoding unit 2221-*m* obtains the monaural decoded digital sound signals in frame number order that were encoded by the encoding apparatus 212-*m*' of the sound signal transmitting side apparatus 210-*m*' that is at the conversation partner location, and outputs the monaural decoded digital sound signals to the extended decoding unit 2222-*m*.

Extended Decoding Unit 2222-*m*

For each frame, a monaural decoded digital sound signal output by the monaural decoding unit 2221-*m* and an extended code input to the decoding apparatus 222-*m* are input to the extended decoding unit 2222-*m*. For each frame, the extended decoding unit 2222-*m* obtains the decoded digital sound signals of two channels based on the input monaural decoded digital sound signal and the extended code and outputs the decoded digital sound signals of two channels to the reproduction unit 223-*m*.

The monaural decoded digital sound signals input to the extended decoding unit 2222-*m* are in frame number order encoded by the encoding apparatus 212-*m*' of the sound signal transmitting side apparatus 210-*m*' that is at the conversation partner location, and the extended code input to the decoding apparatus 222-*m* is the extended code with the frame number that is the closest to that of the monaural decoded digital sound signal. That is, for each frame, the extended decoding unit 2222-*m* obtains decoded digital sound signals of two channels based on the monaural decoded digital sound signal in frame number order output by the encoding apparatus 212-*m*' of the sound signal transmitting side apparatus 210-*m*' that is at the conversation partner location, and the extended code with the frame number that is the closest to that of the monaural decoded digital sound signal, and outputs the decoded digital sound signals of two channels to the reproduction unit 223-*m*. Note that the extended code indicates a feature parameter obtained by the encoding apparatus 212-*m*' of the sound signal transmitting side apparatus 210-*m*' of the multiple-line-compatible terminal apparatus 200-*m*' that is at the conversation partner location, and therefore indicates a parameter indicating the feature of a difference between the digital sound signals of two channels. That is, for each frame, the extended decoding unit 2222-*m* obtains the decoded digital sound signals of two channels and outputs the result to the reproduction unit 223-*m*, assuming that the input monaural decoded digital sound signal is a signal obtained by mixing the decoded digital sound signals of two channels, and assuming that the feature parameter obtained based on the extended code is information indicating the feature of the difference between the digital sound signals of two channels.

First Example of Extended Decoding Unit 2222-*m*

As a first example, an operation for each frame of the extended decoding unit 2222-*m* in the case where the feature parameter is information indicating a time difference in the digital sound signals of two channels will be described. First, the extended decoding unit 2222-*m* obtains information indicating a time difference, which is a feature parameter indicated by the extended code, based on the input extended code (step S2222-11). The extended decoding unit 2222-*m* obtains the feature parameter based on the extended code using a scheme corresponding to the scheme according to which the signal analysis unit 2121-*m*' of the encoding apparatus 212-*m*' of the sound signal transmitting side apparatus 210-*m*' that is at the conversation partner location obtained the extended code based on the feature parameter. The information indicating the time difference, which is the feature parameter, is, for example, the time difference sample count. For example, the extended decoding unit 2222-*m* performs scalar decoding on the input extended code to obtain a scalar value corresponding to the input extended code as the time difference sample count. Alternatively, for example, assuming that the input extended code is a binary value, the extended decoding unit 2222-*m* obtains a decimal number corresponding to the binary number as the time difference sample count.

Next, based on the input monaural decoded digital sound signal and the feature parameter obtained in step S2222-11, the extended decoding unit 2222-*m* obtains and outputs the two decoded digital sound signals, assuming that the input monaural decoded digital sound signal is a signal obtained by mixing two decoded digital sound signals, and assuming that the feature parameter is information indicating the time difference between the two decoded digital sound signals (step S2222-12). More specifically, the extended decoding unit 2222-*m* obtains and outputs, as the digital sound signal of the first channel, one of a sample string of input monaural digital sound signals itself, a series of values obtained by dividing the values of the samples in the sample string of the input monaural digital sound signals by two, and a series obtained by modifying one of these sample strings (step S2222-121). Furthermore, the extended decoding unit 2222-*m* obtains and outputs a sample string obtained by delaying the digital sound signal of the first channel by the time difference sample count indicated by the feature parameter as the sample string of the digital sound signals of the second channel (step S2222-122).

Second Example of Extended Decoding Unit 2222-*m*

As a second example, an operation for each frame of the extended decoding unit 2222-*m* in the case where the feature parameter is information indicating an intensity difference for each frequency band of the digital sound signals of two channels will be described. First, the extended decoding unit 2222-*m* decodes the input extended code to obtain information indicating the intensity difference for each frequency band (step S2222-21). The extended decoding unit 2222-$m$ obtains the feature parameter based on the extended code using a scheme corresponding to the scheme according to which the signal analysis unit 2121-$m'$ of the encoding apparatus 212-$m'$ of the sound signal transmitting side apparatus 210-$m'$ that is at the conversation partner location obtained the extended code based on the information indicating the intensity difference for each frequency band. For example, the extended decoding unit 2222-$m$ performs vector decoding on the input extended code to obtain element values of a vector corresponding to the input extended code as information indicating the intensity difference for each of multiple frequency bands. Alternatively, for example, the extended decoding unit 2222-$m$ performs scalar decoding on each code included in the input extended code to obtain information indicating the intensity difference for each frequency band. Note that if the band count is 1, the extended decoding unit 2222-$m$ performs scalar decoding on the input extended code to obtain information indicating the intensity difference of one frequency band, that is, the entire band.

Next, based on the input monaural decoded digital sound signal and the feature parameter obtained in step S2222-21, the extended decoding unit 2222-$m$ obtains and outputs the two decoded digital sound signals, assuming that the input monaural decoded digital sound signal is a signal obtained by mixing two decoded digital sound signals, and assuming that the feature parameter is information indicating the intensity difference for each frequency band of the two decoded digital sound signals (step S2222-22). If the signal analysis unit 2121-$m'$ of the encoding apparatus 212-$m'$ of the sound signal transmitting side apparatus 210-$m'$ that is at the conversation partner location performs the above-described specific operation using complex DFT, the extended decoding unit 2222-$m$ performs the following operation.

First, the extended decoding unit 2222-$m$ performs complex DFT on the input monaural decoded digital sound signal to obtain a complex DFT coefficient string (step S2222-221). Hereinafter, MQ(f) is a complex DFT coefficient of a monaural complex DFT coefficient string obtained by the extended decoding unit 2222-$m$. The extended decoding unit 2222-$m$ obtains the value MQr(f) of a radius on a complex plane of each complex DFT coefficient and the value MQθ(f) of an angle on the complex plane of each complex DFT coefficient based on the monaural complex DFT coefficient string (step S2222-222). Next, the extended decoding unit 2222-$m$ obtains a value obtained by multiplying a square root of a corresponding value among the feature parameters by the value MQr(f) of each radius as a value VLQr(f) of each radius of the first channel, and obtains a value obtained by dividing the value MQr(f) of each radius by the square root of the corresponding value among the feature parameters as a value VRQr(f) of each radius of the second channel (step S2222-223). In the example of the above-described four bands, the corresponding value among the feature parameters for each frequency bin is Mr(1) when f is 1 to 32, Mr(2) when f is 33 to 64, Mr(3) when f is 65 to 96, and Mr(4) when f is 97 to 128. Note that if the signal analysis unit 2121-$m'$ of the encoding apparatus 212-$m'$ of the sound signal transmitting side apparatus 210-$m'$ that is at the conversation partner location uses the difference between the value of the radius of the first channel and the value of the radius of the second channel instead of the ratio between the value of the radius of the first channel and the value of the radius of the second channel, the extended decoding unit 2222-$m$ need only divide the corresponding value among the feature parameters by 2, add the resulting value to the value MQr(f) of each radius, and obtain the resulting value as the value VLQr(f) of each radius of the first channel, and the extended decoding unit 2222-$m$ need only divide the corresponding value among the feature parameters by 2, subtract the resulting value from the value MQr(f) of each radius, and obtain the resulting value as the value VRQr(f) of each radius of the second channel Next, the extended decoding unit 2222-$m$ performs inverse complex DFT on the series of complex numbers for which the radius on the complex plane is VLQr(f) and the angle is MQθ(f) to obtain and output the decoded digital sound signal of the first channel, and performs inverse complex DFT on the series of complex numbers for which the radius on the complex plane is VRQr(f) and the angle is MQθ(f) to obtain and output the decoded digital sound signal of the second channel (step S2222-224).

Reproduction Unit 223-$m$

The reproduction unit 223-$m$ outputs sound corresponding to the input decoded digital sound signals of two channels (step S223).

The reproduction unit 223-$m$ includes, for example, two DA conversion units and two speakers. The DA conversion unit converts the input decoded digital sound signal into an analog electrical signal and outputs the result. The speaker generates a sound corresponding to the analog electrical signal input from the DA conversion unit. The speakers may also be included in stereo headphones or stereo earphones. In this case, for example, the reproduction unit 223-$m$ generates sounds (decoded sound signals) corresponding to the two decoded digital sound signals from the two speakers with the DA conversion units and the speakers associated in a one-to-one relationship.

Note that all or a portion of the reproduction unit 223-$m$ may also be connected to the sound signal receiving side apparatus 220-$m$ without being included inside of the sound signal receiving side apparatus 220-$m$. For example, the reproduction unit 223-$m$ of the sound signal receiving side apparatus 220-$m$ may also not include the speakers and may output the two analog electrical signals obtained by the DA converter of the reproduction unit 223-$m$ of the sound signal receiving side apparatus 220-$m$ to the speakers connected to the sound signal receiving side apparatus 220-$m$. Alternatively, the sound signal receiving side apparatus 220-$m$ may also not include the reproduction unit 223-$m$, and the decoding apparatus 222-$m$ of the sound signal receiving side apparatus 220-$m$ may output the decoded digital sound signals of two channels to the reproduction device such as the DA converter connected to the sound signal receiving side apparatus 220-$m$.

Operation Example of Sound Signal Receiving Side Apparatus 220-$m$

Figure 5:
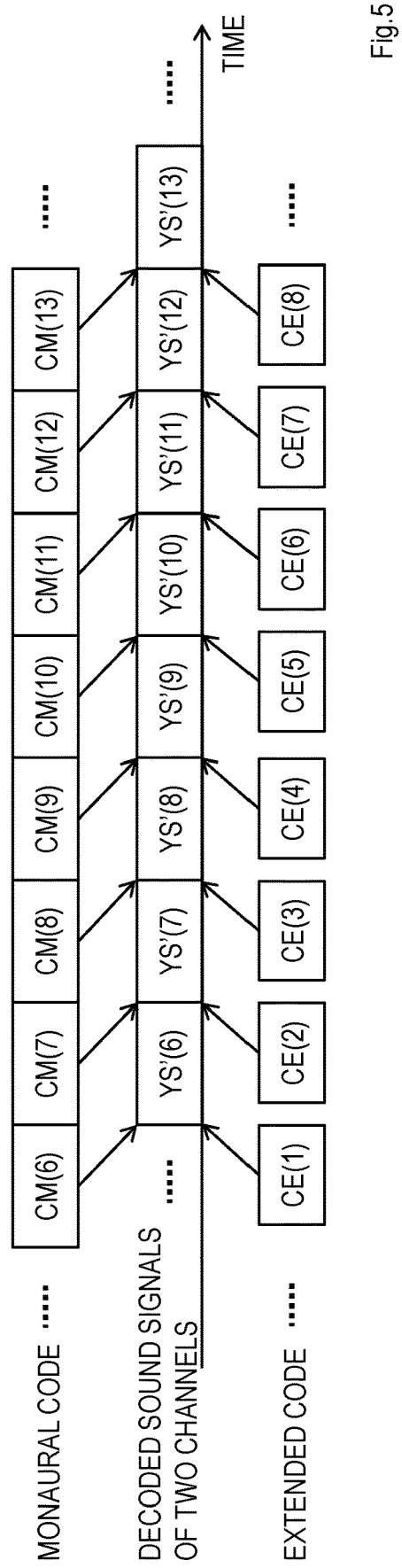
FIG. 5 is a diagram schematically showing a temporal relationship between input codes and output signals in the sound signal receiving side apparatus of the multiple-line-compatible terminal apparatus.

FIG. 5 is a diagram schematically showing a temporal relationship between the monaural code included in the first code string input from the first communication line 410-$m$ to the sound signal receiving side apparatus 220-$m$, the extended code included in the second code string input from the second communication line 510-$m$ to the sound signal receiving side apparatus 220-$m$, and the decoded sound signal output by the sound signal receiving side apparatus 220-$m$, and omitting the processing delay that depends on the processing capability of the apparatus. The horizontal axis of FIG. 5 is a time axis. The number i in the parentheses is the frame number of the encoding apparatus 212-$m'$ of the sound signal transmitting side apparatus 210-$m'$ of the multiple-line-compatible terminal apparatus 200-$m'$ that is at the conversation partner location. CM(i) is a monaural code included in the first code string input from the first communication line 410-$m$ to the sound signal receiving side apparatus 220-$m$. CE(i) is an extended code included in the second code string input from the second communication line 510-$m$ to the sound signal receiving side apparatus 220-$m$. YS'(i) is a decoded sound signal output by the sound signal receiving side apparatus 220-$m$. FIG. 5 is an example in which the sound signal receiving side apparatus 220-$m$ receives input of the second code string in frame number order from the second communication line 510-$m$, which is a communication network with a low priority level, but receives input of the second code string 5 frames later than the first code string in the frame number order from the first communication line 410-$m$, which is a communication network with a high priority level.

The reception unit 221-$m$ outputs a monaural code CM (6) included in the first code string input from the first communication line 410-$m$ and an extended code CE (1) that is included in the second code string with a frame number that is the closest to that of the monaural code CM (6) among the second code string input from the second communication line 510-$m$, to the decoding apparatus 222-$m$ at the time at which the reception of the first code string including the monaural code CM(6) of frame number 6 from the first communication line 410-$m$ ends. At the time at which the monaural code CM(6) and the extended code CE(1) are input, the decoding apparatus 222-$m$ obtains the decoded digital sound signals of two channels corresponding to the input monaural code CM(6) and the extended code CE(1) and outputs the result to the reproduction unit 223-$m$. The reproduction unit 223-$m$ starts the output of the decoded sound signals YS'(6) of two channels corresponding to the two input decoded digital sound signals at the time when the decoded digital sound signals of two channels corresponding to the monaural code CM(6) and the extended code CE(1) are input. This makes it possible for the sound signal receiving side apparatus 220-$m$ to obtain the decoded sound signals YS'(6) of two channels based on the monaural code CM(6) of frame number 6 and the extended code CE(1) included in the second code string with the frame number that is the closest to the frame number 6 and start output at the time when the reception unit 221-$m$ ends reception of the first code string including the monaural code CM(6) of the frame number 6 from the first communication line 410-$m$.

Similarly thereafter as well, the sound signal receiving side apparatus 220-$m$ operates such that at the time when the reception unit 221-$m$ ends reception of the first code string including the monaural code CM(7) of frame number 7 from the first communication line 410-$m$, the decoded sound signals YS'(7) of two channels are obtained based on the monaural code CM(7) of frame number 7 and the extended code CE(2) included in the second code string with the closest frame number to that of the monaural code CM(7), and output is started, and at the time when the reception unit 221-$m$ ends reception of the first code string including the monaural code CM(8) of frame number 8 from the first communication line 410-$m$, the decoded sound signals YS' (8) of two channels are obtained based on the monaural code CM(8) of frame number 8 and the extended code CE(3) included in the second code string with the closest frame number to that of the monaural code CM(8), and output is started, and so on.

Figure 6:
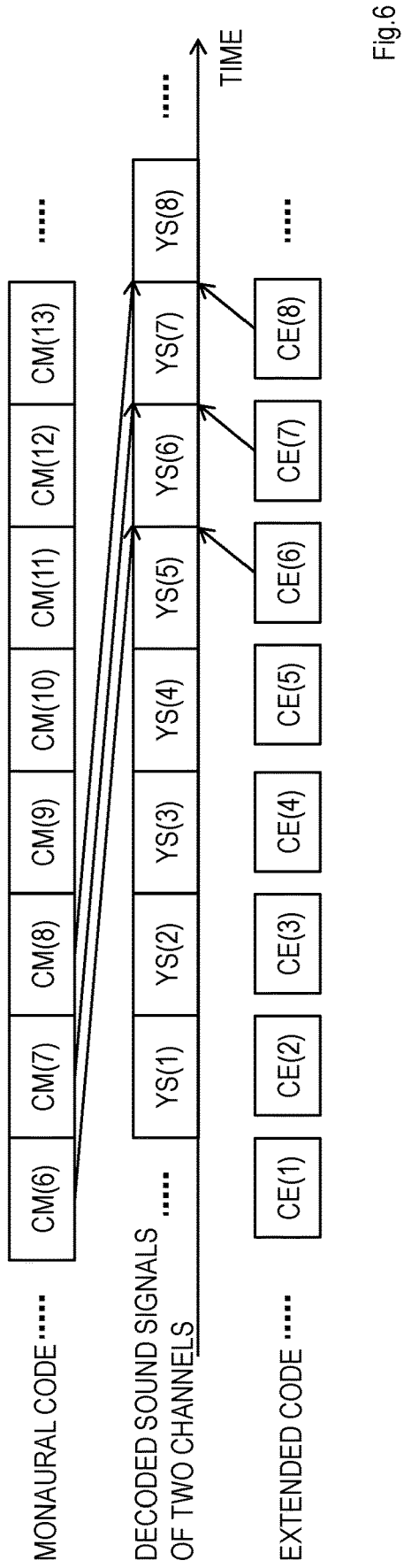
FIG. 6 is a diagram schematically showing a temporal relationship between input codes and output signals in a sound signal receiving side apparatus using a conventional technique.

FIG. 6 is a diagram schematically showing a temporal relationship between the monaural code included in the first code string input to the sound signal receiving side apparatus from the first communication line 410-$m$ in the case of using the technique of PTL 1, the extended code included in the second code string input to the sound signal receiving side apparatus 220-$m$ from the second communication line 510-$m$, and a decoded sound signal output by the sound signal receiving side apparatus, and omitting the processing delay that depends on the processing capability of the apparatus. The horizontal axis, the number i in the parentheses, CM(i), and CE(i) shown in FIG. 6 are the same as those shown in FIG. 5. YS(i) is a decoded sound signal output by the sound signal receiving side apparatus using the technique disclosed in PTL 1. Similarly to FIG. 5, FIG. 6 also shows an example in which the sound signal receiving side apparatus receives input of the second code string in frame number order from the second communication line 510-$m$, which is the communication network with a low priority level, but receives input of the second code string 5 frames later than the first code string in frame number order from the first communication line 410-$m$, which is a communication network with a high priority level. FIG. 6 shows an example in which the above-described time limit in the sound signal receiving side apparatus using the technique of PTL 1 is an amount of time corresponding to 5 frames.

The sound signal receiving side apparatus using the technique of PTL 1 obtains the decoded sound signals YS(6) of two channels corresponding to the monaural code CM(6) input from the first communication line 410-$m$ and the extended code CE(6) that is input from the second communication line 510-$m$ in exactly the restriction time of 5 frames after the monaural code CM(6) is input, and starts output. Similarly thereafter as well, the sound signal receiving side apparatus using the technique of PTL 1 operates such that the decoded sound signals YS(7) of two channels are obtained based on the monaural code CM(7) of frame number 7 and the extended code CE(7) of the frame number 7 input from the second communication line 510-$m$ at the time when 5 frames have elapsed after the reception of the monaural code CM(7) from the first communication line 410-$m$ has ended, and output is started, and the decoded sound signals YS(8) of two channels are obtained based on the monaural code CM(8) of frame number 8 and the extended code CE(8) of the frame number 8 input from the second communication line 510-$m$ at the time when 5 frames have elapsed after the reception of the monaural code CM(8) from the first communication line 410-$m$ has ended, and output is started, and so on.

Effects

As can be understood from FIGS. 6 and 5, in the technique of PTL 1, in order to obtain a decoded sound signal of high sound quality, delays of 5 frames increase relative to obtaining the decoded sound signal of the minimum necessary sound quality, but in the technique of the first embodiment, a decoded sound signal of high sound quality can be obtained without significantly increasing the delay time compared to the case of obtaining a decoded sound signal of the minimum necessary sound quality, that is, with a delay time of such a degree that no sense of discomfort occurs during a two-way conversation.

Second Embodiment

In the first embodiment, the extended code of every frame is obtained and output, but the extended code is obtained and output only once in multiple frames. This mode will be described as the second embodiment.

The second embodiment differs from the first embodiment in the operations of the signal analysis unit 2121-$m$ and the transmission unit 213-$m$ of the encoding apparatus 212-$m$ of the sound signal transmitting side apparatus 210-$m$. Hereinafter, the respects in which the second embodiment differs from the first embodiment will be described.

Signal Analysis Unit 2121-$m$

Similarly to the signal analysis unit 2121-$m$ of the first embodiment, for each frame, the signal analysis unit 2121-$m$ obtains and outputs a monaural signal, which is a signal obtained by mixing the input digital sound signals of two channels, based on the input digital sound signals of two channels, but unlike the signal analysis unit 2121-$m$ of the first embodiment, for only a predetermined frame among multiple frames, the signal analysis unit 2121-$m$ obtains and outputs an extended code indicating a feature parameter, which is a parameter indicating a feature of a difference between the input digital sound signals of two channels and is a parameter with little temporal variation.

For example, for frames with odd frame numbers, the signal analysis unit 2121-$m$ obtains a feature parameter based on the input digital sound signals of two channels, obtains an extended code indicating the feature parameter, and outputs the result, but for frames with even frame numbers, the signal analysis unit 2121-$m$ does not obtain or output the feature parameter or the extended code indicating the feature parameter. Note that if a configuration is used in which the feature parameter is used when the signal analysis unit 2121-$m$ is to obtain the monaural signal, for frames for which the feature parameter is not obtained, the signal analysis unit 2121-$m$ obtains the monaural signal using the input digital sound signals of two channels of the frame and the feature parameters corresponding to the most recent extended code among the extended codes that have already been output.

Alternatively, for example, for frames with odd frame numbers, the signal analysis unit 2121-$m$ obtains a feature parameter based on the input digital sound signals of two channels but does not obtain or output the extended code indicating the feature parameter, and for frames with even frame numbers, the signal analysis unit 2121-$m$ obtains the feature parameter based on the input digital sound signals of two channels and obtains and outputs an extended code indicating an average or a weighted average of a feature parameter of the immediately-previous frame for which the extended code indicating the feature parameter was not obtained or output and the feature parameter of the frame. The weight to be used in the weighted average need only be a value according to which the weight of the frame is greater than the weight of the immediately-previous frame.

Although the above-described two examples are configurations in which the extended code is obtained and output once every two frames, it is also possible to use a configuration in which the extended code is obtained and output once every three or more frames, and it is also possible to use a configuration in which the extended code is obtained and output for a predetermined frame among the multiple frames.

That is, for each frame, the encoding apparatus 212-$m$ of the present second embodiment obtains the monaural code indicating a signal obtained by mixing the input digital sound signals of two channels, and for predetermined frames among the multiple frames, the encoding apparatus 212-$m$ obtains an extended code indicating a feature parameter, which is parameter indicating a feature of a difference between the channels of the input digital sound signals of two channels and that has a low temporal resolution.

Alternatively, for each frame, the encoding apparatus 212-$m$ of the present second embodiment obtains a monaural code indicating a signal obtained by mixing the input digital sound signals of two channels, for each frame, the encoding apparatus 212-$m$ obtains a feature parameter, which is a parameter indicating a feature of a difference between the channels of the input digital sound signals of two channels and is a parameter that has a low temporal resolution, and for a predetermined frame of multiple frames, the encoding apparatus 212-$m$ obtains an extended code indicating an average or a weighted average of the feature parameter obtained for each frame after the immediately-previous predetermined frame. The weight to be used in the weighted average need only be the greatest value for the frame, or a value that is smaller the further a frame is from the frame.

Note that as will be described later, the monaural code obtained by the encoding apparatus 212-$m$ is a code that is output to the first communication line in a state of being included in the first code string, and the extended code obtained by the encoding apparatus 212-$m$ is a code that is output to the second communication line in a state of being included in the second code string.

Transmission Unit 213-$m$

Similarly to the transmission unit 213-$m$ of the first embodiment, for each frame, the transmission unit 213-$m$ outputs the first code string, which is the code string including the input monaural code, to the first communication line 410-$m$, but unlike the transmission unit 213 of the first embodiment, for only the frames for which the extended code was input, that is, for only predetermined frames among the multiple frames, the transmission unit 213-$m$ outputs the second code string, which is the code string including the input extended code, to the second communication line 510-$m$.

Effects

As described in the first embodiment, the extended code to be used by the sound signal receiving side apparatus 220-$m$ is the extended code with the closest frame number to that of the monaural code, and therefore it is not essential that the extended code with the same frame number as the monaural code is input to the sound signal receiving side apparatus 220-$m$. Also, the feature parameter is originally a parameter with little temporal variation. Accordingly, with the present embodiment, by employing a configuration in which the extended code is obtained and output only once for multiple frames, it is possible to reduce the calculation processing amount of the signal analysis unit 2121-$m$ and to make the amount of code for transmitting the feature parameter smaller than that of the first embodiment, without causing the quality of the decoded sound signal to deteriorate significantly compared to the first embodiment.

Third Embodiment

Although the sound signal receiving side apparatus 220-$m$ obtained the extended code to be used in decoding for each frame in the first embodiment, the sound signal receiving side apparatus 220-$m$ may also obtain the extended code to be used in decoding only once every multiple frames. This mode will be described as a third embodiment.

The sound signal receiving side apparatus 220-$m$ of the third embodiment differs from the sound signal receiving side apparatus 220-$m$ of the first embodiment in the operation of the reception unit 221-$m$ and the extended decoding unit 2222-$m$ of the decoding apparatus 222-$m$. Hereinafter, the respects in which the third embodiment differs from the first embodiment will be described.

Reception Unit 221-$m$

Similarly to the reception unit 221-$m$ of the first embodiment, for each frame, the reception unit 221-$m$ outputs the monaural code included in the first code string input from the first communication line 410-$m$ to the decoding apparatus 222-$m$, but unlike the reception unit 221-$m$ of the first embodiment, for only predetermined frames among the multiple frames, the reception unit 221-$m$ obtains and outputs an extended code with the closest frame number to that of the monaural code among the extended codes included in the input second code string. That is, more specifically, for only predetermined frames among the multiple frames, the reception unit 221-$m$ obtains the extended code with the closest frame number to that of the monaural code among the extended codes included in the input second code string from a storage unit (not shown) in the reception unit 221-$m$, and outputs the obtained extended code.

Extended Decoding Unit 2222-$m$

Similarly to the extended decoding unit 2222-$m$ of the first embodiment, for each frame, the extended decoding unit 2222-$m$ receives input of the monaural decoded digital sound signal output by the monaural decoding unit 2221-$m$, but unlike the extended decoding unit 2222-$m$ of the first embodiment, the extended decoding unit 2222-$m$ receives input of the extended code for only predetermined frames among the multiple frames. For predetermined frames among the multiple frames, that is, frames for which the extended code was also input, similarly to the extended decoding unit 2222-$m$ of the first embodiment, the extended decoding unit 2222-$m$ obtains the decoded digital sound signals of two channels based on the input monaural decoded digital sound signal and the extended code and outputs the obtained decoded digital sound signals, and for frames other than the predetermined frames among the multiple frames, that is, frames for which the extended codes were not input, unlike the extended decoding unit 2222-$m$ of the first embodiment, the extended decoding unit 2222-$m$ obtains decoded digital sound signals of two channels based on the input monaural decoded digital sound signal and the most recent extended code among the already-input extended codes, and outputs the obtained decoded digital sound signals.

That is, for predetermined frames among the multiple frames, the decoding apparatus 222-$m$ obtains the decoded digital sound signals of two channels based on the monaural code included in the first code string input from the first communication line 410-$m$ and the extended code that is included in the second code string input from the second communication line 510-$m$ and has the closest frame number to that of the monaural code, and outputs the obtained decoded digital sound signals, and for frames other than the predetermined frames, the decoding apparatus 222-$m$ obtains the decoded digital sound signals of two channels based on the monaural code included in the first code string input from the first communication line 410-$m$ and the most recent extended code used in the predetermined frames, and outputs the obtained decoded digital sound signals. Specifically, for predetermined frames among the multiple frames, if an extended code with the same frame number as the monaural code (i.e., the monaural code in frame number order) included in the first code string input from the first communication line 410-$m$ is included in the extended codes included in the second code string input from the second communication line 510-$m$, the decoding apparatus 222-$m$ obtains and outputs the decoded digital sound signals of two channels based on the monaural code (i.e., the monaural code in frame number order) included in the first code string input from the first communication line 410-$m$ and the extended code with the same frame number as that of the monaural code, and if the extended code with the same frame number as the monaural code (i.e., the monaural code in frame number order) included in the first code string input from the first communication line 410-$m$ is not included in the extended codes included in the second code string input from the second communication line 510-$m$, the decoding apparatus 222-$m$ obtains and outputs the decoded digital sound signals of two channels based on the monaural code (i.e., the monaural code in frame number order) included in the first code string input from the first communication line 410-$m$ and an extended code that is included in the second code string input from the second communication line 510-$m$ and has the closest frame number to that of the monaural code (i.e., an extended code that does not have the same frame number as the monaural code, but has the closest frame number to that of the monaural code), and for the frames other than the predetermined frames, the decoding apparatus 222-$m$ obtains and outputs the decoded digital sound signals of two channels based on the monaural code (i.e., the monaural code in frame number order) included in the first code string input from the first communication line 410-$m$ and the most recent extended code used in the predetermined frames.

More specifically, for each frame, the monaural decoding unit 2221-$m$ of the decoding apparatus 222-$m$ decodes the monaural code included in the first code string input from the first communication line 410-$m$ to obtain the monaural decoded digital sound signal, and for predetermined frames among the multiple frames, the extended decoding unit 2222-$m$ of the decoding apparatus 222-$m$ obtains and outputs the decoded digital sound signals of two channels, assuming that the monaural decoded digital sound signal is a signal obtained by mixing the decoded digital sound signals of two channels, and assuming that the feature parameter obtained based on the extended code that is included in the second code string input from the second communication line 510-$m$ and has the closest frame number to that of the monaural code included in the first code string input from the first communication line 410-$m$ is information indicating the feature of the difference between the channels of the decoded digital sound signals of two channels. Note that since the extended decoding unit 2222-$m$ has used the feature parameter obtained based on the extended code in the predetermined frame, the feature parameter can be stored, and can be used for frames other than the predetermined frames. That is, for frames other than the predetermined frames, the extended decoding unit 2222-$m$ obtains and outputs the decoded digital sound signals of two channels, assuming that the monaural decoded digital sound signal is a signal obtained by mixing the decoded digital sound signals of two channels, and assuming that the most recent feature parameter obtained for the predetermined frames is information indicating the feature of the difference between the channels of the decoded digital sound signals of two channels.

That is, for each frame, the monaural decoding unit 2221-*m* of the decoding apparatus 222-*m* decodes a monaural code (i.e., the monaural code in frame number order) included in the first code string input from the first communication line 410-*m* to obtain a monaural decoded digital sound signal, and for predetermined frames among the multiple frames, if an extended code with the same frame number as the monaural code (i.e., the monaural code in frame number order) included in the first code string input from the first communication line 410-*m* is included in the extended codes included in the second code string input from the second communication line 510-*m*, the extended decoding unit 2222-*m* of the decoding apparatus 222-*m* obtains and outputs the decoded digital sound signals of two channels, assuming that the monaural decoded digital sound signal is a signal obtained by mixing the decoded digital sound signals of two channels, and assuming that the feature parameter obtained based on the extended code with the same frame number as the monaural code is information indicating a feature of a difference between channels of the decoded digital sound signals of two channels, and if an extended code with the same frame number as the monaural code (i.e., the monaural code in frame number order) included in the first code string input from the first communication line 410-*m* is not included in the extended codes included in the second code string input from the second communication line 510-*m*, the extended decoding unit 2222-*m* obtains and outputs the decoded digital sound signals of two channels, assuming that the monaural decoded digital sound signal is a signal obtained by mixing the decoded digital sound signals of two channels, and assuming that the feature parameter obtained based on an extended code that is included in the second code string input from the second communication line 510-*m* and has the closest frame number to that of the monaural code included in the first code string input from the first communication line 410-*m* (i.e., an extended code that has a frame number that is not the same as that of the monaural code but has a frame number that is the closest to that of the monaural code) is information indicating a feature of a difference between the channels of the decoded digital sound signals of two channels, and for the frames other than the predetermined frames, the extended decoding unit 2222-*m* obtains and outputs decoded digital sound signals of two channels, assuming that the monaural decoded digital sound signal is a signal obtained by mixing the decoded digital sound signals of two channels, and assuming that the most recent feature parameter obtained for the predetermined frames is information indicating the feature of a difference between channels of the decoded digital sound signals of two channels.

Variation of Third Embodiment

Note that instead of the third embodiment, it is also possible to use a configuration in which the extended decoding unit 2222-*m* performs operations similar to those of the first embodiment, and for predetermined frames among multiple frames, the reception unit 221-*m* outputs a monaural code that is included in the first code string input from the first communication line 410-*m* and an extended code with the closest frame number to that of the monaural code among the extended codes included in the second code string input from the second communication line 510-*m*, and for the frames other than the predetermined frames among the multiple frames, the reception unit 221-*m* outputs a monaural code included in the first code string input from the first communication line 410-*m* and the most recent extended code among the already-output extended codes.

More specifically, it is also possible to use configuration in which, for predetermined frames among multiple frames, if the extended code with the same frame number as the monaural code (i.e., the monaural code in frame number order) included in the first code string input from the first communication line 410-*m* is included in the extended codes included in the second code string input from the second communication line 510-*m*, the reception unit 221-*m* outputs the monaural code and the extended code with the same frame number as the monaural code, and if the extended code with the same frame number as the monaural code (i.e., the monaural code in frame number order) included in the first code string input from the first communication line 410-*m* is not included in the extended codes included in the second code string input from the second communication line 510-*m*, the reception unit 221-*m* outputs the monaural code (i.e., the monaural code in frame number order) included in the first code string input from the first communication line 410-*m* and an extended code with the closest frame number to that of the monaural code among the extended codes included in the second code string input from the second communication line 510-*m* (i.e., an extended code that does not have the same frame number as the monaural code but has the closest frame number to that of the monaural code among the extended codes included in the second code string input from the second communication line 510-*m*), and for the frames other than the predetermined frames among the multiple frames, the reception unit 221-*m* outputs a monaural code (monaural code in frame number order) included in the first code string input from the first communication line 410-*m* and the most recent extended code among the already-output extended codes.

Effects

As described in the first embodiment, the extended code to be used by the sound signal receiving side apparatus 220-*m* is the extended code with the closest frame number to that of the monaural code, and therefore it is not essential that the extended code with the same frame number as the monaural code is input to the extended decoding unit 2222-*m*. Also, the feature parameter is originally a parameter with little temporal variation. Accordingly, with the present embodiment and variation, by employing a configuration in which the extended code is obtained once every multiple frames, it is possible to reduce the computation processing amount of the reception unit 221-*m* and amount of information to be output without causing the quality of the decoded sound signal to deteriorate significantly compared to the first embodiment.

Fourth Embodiment

The sound signal receiving side apparatus 220-*m* of the first embodiment may also use an average or weighted average of a feature parameter indicated by the extended code input for the frame being processed and the feature parameters of past frames as the feature parameter to be used when obtaining the two decoded digital sound signals. This mode will be described as a fourth embodiment.

The fourth embodiment differs from the first embodiment in the operation of the extended decoding unit 2222-*m* of the decoding apparatus 222-*m* of the sound signal receiving side apparatus 220-*m*. Hereinafter, the respects in which the fourth embodiment differs from the first embodiment will be described. Hereinafter, a frame being processed at that time by the extended decoding unit 2222-*m* that performs processing for each frame will be called a "current frame", and a frame from the past relative thereto will be called a "past frame".

Extended Decoding Unit 2222-*m*

Similarly to the extended decoding unit 2222-*m* of the first embodiment, for each frame, the extended decoding unit 2222-*m* receives input of the monaural decoded digital sound signal output by the monaural decoding unit 2221-*m* and the extended code input to the decoding apparatus 222-*m*. The extended decoding unit 2222-*m* includes a storage unit (not shown). The storage unit stores the feature parameters obtained by the extended decoding unit 2222-*m* in past frames. For each frame, the extended decoding unit 2222-*m* obtains the decoded digital sound signals of two channels based on the input monaural decoded digital sound signal, the input extended code, and the feature parameters of the past frames stored in the storage unit, and outputs the result to the reproduction unit 223-*m*. Specifically, the extended decoding unit 2222-*m* performs the following steps S2222-31 to S2222-35 for each frame.

First, the extended decoding unit 2222-*m* obtains the feature parameter indicated by the extended code based on the input extended code (step S2222-31) and stores the obtained feature parameter in the storage unit (step S2222-32). Next, the extended decoding unit 2222-*m* reads out K (K being an integer that is at least 1) feature parameters of the past frames stored in the storage unit (step S2222-33). For example, the feature parameters of K past frames that are continuous with the current frame are read out. Next, the extended decoding unit 2222-*m* obtains the average or weighted average of the feature parameters of the K past frames read out from the storage unit and the feature parameter of the current frame (step S2222-34). The weight to be used in the weighted average need only be a value according to which the feature parameter of the current frame is the greatest, and a value that is smaller the farther the frame is from the current frame. Next, based on the input monaural decoded digital sound signal and the average or weighted average of the feature parameters obtained in step S2222-34, the extended decoding unit 2222-*m* obtains and outputs the two decoded digital sound signals and outputs them to the reproduction unit 223-*m*, assuming that the input monaural decoded digital sound signal is a signal obtained by mixing two decoded digital sound signals, and assuming that the average or weighted average of the feature parameters obtained in step S2222-34 is information indicating the feature of the difference between the two decoded digital sound signals (step S2222-35). Note that instead of step S2222-32 in which the feature parameter indicated by the extended code is stored in the storage unit, the extended decoding unit 2222-*m* may also store the average or the weighted average obtained in step S2222-34 in the storage unit as the feature parameter of the current frame. Also, since it is sufficient that K feature parameters of past frames are stored in the storage unit of the extended decoding unit 2222-*m*, the feature parameters of K+1 or more past frames may be deleted from the storage unit in the processing of the frame subsequent to the current frame.

Variation of Fourth Embodiment

Similarly to the sound signal receiving side apparatus 220-*m* of the first embodiment, the sound signal receiving side apparatus 220-*m* of the third embodiment may also use the average or the weighted average of the feature parameter indicated by the extended code input in the frame being processed and the feature parameters of the past frames as the feature parameter to be used when obtaining two decoded digital sound signals. That is, in the extended decoding unit 2222-*m* of the decoding apparatus 222-*m* of the sound signal receiving side apparatus 220-*m* of the third embodiment, for predetermined frames among the multiple frames, the average or weighted average of the feature parameter indicated by the extended code input in the frame being processed and the feature parameters of the past frames may also be used as the feature parameter to be used when obtaining the two decoded digital sound signals. This mode will be described as a variation of the fourth embodiment.

The variation of the fourth embodiment differs from the third embodiment in the operation of the extended decoding unit 2222-*m* of the decoding apparatus 222-*m* of the sound signal receiving side apparatus 220-*m*. Hereinafter, the respects in which the variation of the fourth embodiment differs from the third embodiment will be described. Hereinafter, a frame being processed at that time by the extended decoding unit 2222-*m* that performs processing for each frame will be called a "current frame", and a frame from the past relative thereto will be called a "past frame".

Extended Decoding Unit 2222-*m*

Similarly to the extended decoding unit 2222-*m* of the third embodiment, for each frame, the extended decoding unit 2222-*m* receives input of the monaural decoded digital sound signal output by the monaural decoding unit 2221-*m*, and for only predetermined frames among the multiple frames, the extended decoding unit 2222-*m* receives input of the extended code. The extended decoding unit 2222-*m* includes a storage unit (not shown). At least the average or the weighted average of the feature parameter obtained by the extended decoding unit 2222-*m* in the past frame is stored in the storage unit, and the feature parameter indicated by the extended code of the past frame is stored therein in some cases.

For predetermined frames among the multiple frames, that is, frames for which the extended code is also input, the extended decoding unit 2222-*m* performs the following steps S2222-41 to S2222-46.

First, the extended decoding unit 2222-*m* obtains the feature parameter indicated by the extended code from the input extended code (step S2222-41) and stores the obtained feature parameter in the storage unit (step S2222-42). Next, the extended decoding unit 2222-*m* reads out K (K being an integer that is at least 1) feature parameters of the past frames stored in the storage unit (step S2222-43). For example, the feature parameters of K past frames that are the closest to the current frame are read out. Since the feature parameters are stored in the storage unit only for the frames for which the extended codes are also input, the read-out feature parameters are the feature parameters of K frames that are continuous with the current frame among the frames for which the extended code has also been input. Next, the extended decoding unit 2222-*m* obtains the average or weighted average of the feature parameters of the K past frames read out from the storage unit and the feature parameter of the current frame (step S2222-44), and stores the obtained average or the weighted average of the feature parameters in the storage unit (step S2222-45). The weight to be used in the weighted average need only be a value according to which the feature parameter of the current frame is the greatest, and a value that is smaller the farther a frame is from the current frame. Next, based on the input monaural decoded digital sound signal and the average or weighted average of the feature parameters obtained in step S2222-44, the extended decoding unit 2222-$m$ obtains the two decoded digital sound signals and outputs them to the reproduction unit 223-$m$, assuming that the input monaural decoded digital sound signal is a signal obtained by mixing two decoded digital sound signals, and assuming that the average or weighted average of the feature parameters obtained in step S2222-44 is information indicating the difference between the two decoded digital sound signals (step S2222-46). Note that the extended decoding unit 2222-$m$ may also read out the average or weighted average stored in the storage unit in step S2222-45 as the feature parameter of a past frame in step S2222-43 without performing step S2222-42 in which the feature parameter indicated by the extended code is stored in the storage unit. Also, since it is sufficient that K feature parameters of past frames are stored in the storage unit of the extended decoding unit 2222-$m$, the feature parameters of K+1 or more past frames may be deleted from the storage unit in the processing of the frame subsequent to the current frame. Also, since it is sufficient that only the most recent average or weighted average of the feature parameters obtained in the step S2222-44 is stored in the storage unit of the extended decoding unit 2222-$m$, the average or weighted average of the feature parameters stored in the storage unit may be deleted from the storage unit at the time of performing step S2222-45.

The extended decoding unit 2222-$m$ of the variation of the fourth embodiment performs the following steps S2222-47 to S2222-48 for the frames other than the predetermined frames among the multiple frames, that is, the frames for which the extended code was not input.

First, the extended decoding unit 2222-$m$ reads out the most recent average or weighted average of the feature parameter stored in the storage unit from the storage unit (step S2222-47). Next, based on the input monaural decoded digital sound signal and the average or weighted average of the feature parameters obtained in step S2222-47, the extended decoding unit 2222-$m$ obtains the two decoded digital sound signals and outputs them to the reproduction unit 223-$m$, assuming that the input monaural decoded digital sound signal is a signal obtained by mixing two decoded digital sound signals, and assuming that the average or weighted average of the feature parameters obtained in step S2222-47 is information indicating the difference between the two decoded digital sound signals (step S2222-48).

Effects

Although the feature parameter is a parameter with little temporal variation when viewed statistically, since the feature of the sound signal of each frame is reflected therein, it is not often a value that is completely the same over multiple frames, and its value significantly differs between frames in some cases. Accordingly, in the sound signal receiving side apparatus 220-$m$, it is possible to suppress sudden fluctuation between channels of the decoded sound signal, generation of a different sound, and the like by using the average, weighted average, or the like of the feature parameters indicated by multiple extended codes that are temporally near as in the fourth embodiment and the variation, instead of using the feature parameter indicated by one given extended code that is different from the original extended code of that frame.

Fifth Embodiment

Although the sound signal receiving side apparatus 220-$m$ obtained the decoded digital sound signals of two channels using the extended code with the frame number that is the closest to that of the monaural code for each frame in the first embodiment, it is also possible to use the decoded digital sound signal obtained by decoding the monaural code as the decoded digital sound signal of two channels for frames for which there is no extended code in a predetermined time limit range from the monaural code. This mode will be described as a fifth embodiment.

The fifth embodiment differs from the first embodiment in the operation of the reception unit 221-$m$ and the decoding apparatus 222-$m$ of the sound signal receiving side apparatus 220-$m$. Also, the extended decoding unit 2222-$m$ performs the operations in the decoding apparatus 222-$m$ according to which the fifth embodiment differs from the first embodiment. Hereinafter, the respects in which the fifth embodiment differs from the first embodiment will be described.

Reception Unit 221-$m$

For frames for which the difference in frame number between the monaural code that is included in the first code string input from the first communication line 410-$m$ and the extended code with the closest frame number to that of the monaural code among the extended codes included in the second code string input from the second communication line 510-$m$ is less than a predetermined value, the reception unit 221-$m$ outputs a monaural code included in the first code string input from the first communication line 410-$m$ and the extended code with the closest frame number to that of the monaural code among the extended codes included in the second code string input from the second communication line 510-$m$, and for frames for which the above-described difference in frame number is not less than a predetermined value, the reception unit 221-$m$ outputs a monaural code included in the first code string input from the first communication line 410-$m$. Specifically, the reception unit 221-$m$ performs the following steps S221-11 to S221-15 for each frame.

The reception unit 221-$m$ outputs the monaural code included in the first code string input from the first communication line 410-$m$ to the decoding apparatus 222-$m$ (step S221-11). Next, the reception unit 221-$m$ obtains the frame number of the monaural code output in step S221-11 (step S221-12). Next, the reception unit 221-$m$ obtains the extended code included in the second code string with the closest frame number to the frame number of the monaural code obtained in step S221-12 in the second code string input from the second communication line 510-$m$, and the frame number of that extended code (step S221-13). Next, the reception unit 221-$m$ determines whether or not the difference between the frame number of the monaural code obtained in step S221-12 and the frame number of the extended code obtained in step S221-13 is less than a predetermined value (step S221-14). Next, if the difference between the frame number of the monaural code and the frame number of the extended code is less than a predetermined value in step S221-14, the reception unit 221-$m$ outputs the extended code to the decoding apparatus 222-$m$ (step S221-15). If the difference between the frame number of the monaural code and the frame number of the extended code is not less than the predetermined value in step S221-14, the reception unit 221-*m* does not output the extended code. That is, if the difference between the frame number of the monaural code and the frame number of the extended code is not less than the predetermined value in step S221-14, the reception unit 221-*m* need only output only the monaural code.

Here, the predetermined value is a value that is at least 2. That is, for frames for which the difference in frame number between the monaural code (i.e., the monaural code in frame number order) included in the first code string input from the first communication line 410-*m* and the extended code with the closest frame number to that of the monaural code among the extended codes included in the second code string input from the second communication line 510-*m* is 0 (i.e., for frames in which the extended code with same frame number as the monaural code included in the first code string input from the first communication line 410-*m* is included in the second code string input from the second communication line 510-*m*), the reception unit 221-*m* outputs the monaural code (i.e., the monaural code in frame number order) included in the first code string input from the first communication line 410-*m* and the extended code with the same frame number as the monaural code among the extended codes included in the second code string input from the second communication line 510-*m*, for frames for which the above-described difference in frame number is greater than 0 and less than a predetermined number, the reception unit 221-*m* outputs the monaural code (i.e., the monaural code in frame number order) included in the first code string input from the first communication line 410-*m*, and the extended code with the closest frame number to that of the monaural code among the extended codes included in the second code string input from the second communication line 510-*m* (i.e., an extended code that does not have the same frame number as the monaural code but has the frame number that is the closest to that of the monaural code among the extended codes included in the second code string input from the second communication line 510-*m*), and for frames for which the above-described difference in frame number is not less than the predetermined value, the reception unit 221-*m* outputs only the monaural code (i.e., the monaural code in frame number order) included in the first code string input from the first communication line 410-*m*.

Decoding Apparatus 222-*m*

For each frame, a monaural code output by the reception unit 221-*m* is input without fail to the decoding apparatus 222-*m*, and an extended code output by the reception unit 221-*m* is input thereto in some cases. For each frame, the decoding apparatus 222-*m* obtains decoded digital sound signals of two channels corresponding to the input monaural code and extended code or to the input monaural code, and outputs them to the reproduction unit 223-*m*. Specifically, for frames for which the above-described difference in frame number is less than the predetermined value, the decoding apparatus 222-*m* obtains and outputs the decoded digital sound signals of two channels based on the monaural code output by the reception unit 221-*m* and the extended code output by the reception unit 221-*m*, and for frames for which the above-described difference in frame number is not less than the predetermined value, the decoding apparatus 222-*m* outputs the monaural digital sound signal obtained based on the monaural code output by the reception unit 221-*m* as-is as the decoded digital sound signals of two channels.

Extended Decoding Unit 2222-*m*

For each frame, a monaural decoded digital sound signal output by the monaural decoding unit 2221-*m* is input without fail to the extended decoding unit 2222-*m* and an extended code input to the decoding apparatus 222-*m* is input thereto in some cases. For frames for which the monaural decoded digital sound signal and the extended code are input, the extended decoding unit 2222-*m* obtains the decoded digital sound signals of two channels through operations that are the same as those of the extended decoding unit 2222-*m* of the first embodiment based on the input monaural decoded digital sound signal and the extended code, and outputs the result to the reproduction unit 223-*m*. For frames for which only the monaural decoded digital sound signal is input, the extended decoding unit 2222-*m* obtains the input monaural decoded digital sound signal as-is as the decoded digital sound signals of two channels and outputs the result to the reproduction unit 223-*m*.

That is, for frames for which the difference in frame number between the monaural code included in the first code string input from the first communication line 410-*m* and the extended code that is included in the second code string input from the second communication line 510-*m* and has the closest frame number to that of the monaural code is less than the predetermined value, the decoding apparatus 222-*m* obtains and outputs the decoded digital sound signals of two channels based on the monaural code and the extended code with the closest frame number to that of the monaural code, and for frames for which the above-described difference in frame number is not less than the predetermined value, the decoding apparatus 222-*m* outputs the decoded digital sound signal obtained based on the monaural code included in the first code string input from the first communication line 410-*m* as-is as the decoded digital sound signals of two channels.

More specifically, for frames for which the difference in frame number between the monaural code (i.e., the monaural code in frame number order) included in the first code string input from the first communication line 410-*m* and the extended code that is included in the second code string input from the second communication line 510-*m* and has the closest frame number to that of the monaural code is 0 (i.e., frames in for which the extended code with the same frame number as the monaural code included in the first code string input from the first communication line 410-*m* is included in the second code string input from the second communication line 510-*m*), the decoding apparatus 222-*m* obtains and outputs the decoded digital sound signals of two channels based on the monaural code and the extended code with the same frame number as the monaural code, for frames for which the above-described difference in frame number is greater than zero and less than the predetermined value, the decoding apparatus 222-*m* obtains and outputs the decoded digital sound signals of two channels based on the monaural code (i.e., the monaural code in frame number order) included in the first code string input from the first communication line 410-*m* and the extended code with the closest frame number to that of the monaural code (i.e., an extended code that does not have the same frame number as the monaural code but has the closest frame number to that of the monaural code among the extended codes included in the second code string input from the second communication line 510-*m*), and for frames for which the above-described difference in frame number is not less than the above-described value, the decoding apparatus 222-*m* outputs the decoded digital sound signals obtained based on the monaural code (i.e., the monaural code in frame number order) included in the first code string input from the first communication line 410-*m* as the decoded digital sound signals of two channels.

Variation of Fifth Embodiment

Although the sound signal receiving side apparatus 220-*m* of the fifth embodiment having a configuration based on that of the sound signal receiving side apparatus 220-*m* of the first embodiment and its operation were described above, operation may also be performed by forming the sound signal receiving side apparatus 220-*m* of the fifth embodiment based on the sound signal receiving side apparatus 220-*m* of any of the third embodiment, the fourth embodiment, and the variations thereof.

Effects

Due to the fact that the encoding apparatus 212-*m'* of the sound signal transmitting side apparatus 210-*m'* of the multiple-line-compatible terminal apparatus 200-*m'* that is at the conversation partner location has performed encoding for each frame of a predetermined time segment, the difference between the frame number of the monaural code and the frame number of the extended code corresponds to the time difference of the digital sound signal encoded by the encoding apparatus 212-*m'* of the sound signal transmitting side apparatus 210-*m'* of the multiple-line-compatible terminal apparatus 200-*m'* that is at the conversation partner location. For example, if the frame length is 20 ms and if the difference in frame number is 150, there will be a 3-second time difference in the digital sound signal for which the monaural code was obtained and the digital sound signal for which the extended code was obtained. Even if the parameter has little temporal variation, if the time differs significantly, there is a possibility that the value will be significantly different. Accordingly, if there is a time difference of such an extent that the feature parameter indicated by the extended code differs significantly, there is a possibility that a significant error has occurred in the division of the signal between the channels of the decoded sound signals of two channels in which the feature of the difference between the two channels is reflected. According to the present fifth embodiment, it is possible to suppress significant error in the division of the signal between channels of the decoded sound signal by not adding a difference to the decoded sound signals of the two channels for frames for which the difference in frame number between the monaural code included in the first code string received from the first communication line and the extended code with the closest frame number to that of the monaural code among the extended codes included in the second code string received from the second communication line is large. For example, if it is envisioned that the feature parameter will significantly differ if the time difference is 400 ms or more, in the case where the frame length is 20 ms, the feature parameter will be significantly different when the difference between the frame numbers reaches 20 or more, and therefore the above-described predetermined value need only be set to 20.

Sixth Embodiment

If the average value of the time difference is not within a predetermined time limit based on the average value of a time difference between a first code string input from the first communication line 410-*m* and a second code string input from the second communication line 510-*m* with the same frame number as that of the first code string, the time difference having been measured in a predetermined time range, the sound signal receiving side apparatus 220-*m* may use the decoded digital sound signals obtained by decoding the monaural code as the decoded digital sound signals of two channels. This mode will be described as a sixth embodiment.

The sixth embodiment differs from the first embodiment in the operation of the reception unit 221-*m* and the decoding apparatus 222-*m* of the sound signal receiving side apparatus 220-*m*. Also, the extended decoding unit 2222-*m* performs the operations in the decoding apparatus 222-*m* according to which the sixth embodiment differs from the first embodiment. Hereinafter, the respects in which the sixth embodiment differs from the first embodiment will be described.

Reception Unit 221-*m*

The reception unit 221-*m* receives input of the first code string output by the sound signal transmitting side apparatus 210-*m'* that is at the conversation partner location from the first communication line 410-*m*, and receives input of the second code string output by the sound signal transmitting side apparatus 210-*m'* that is at the conversation partner location from the second communication line 510-*m*. Since the second communication line is a communication network with a low priority level, the reception unit 221-*m* normally receives input of the second code string of a given frame output by the sound signal transmitting side apparatus 210-*m'* that is at the conversation partner location from the second communication line 510-*m* after receiving input of the first code string of the frame from the first communication line 410-*m*.

First, the reception unit 221-*m* determines whether or not the average value, for multiple sets each composed of a first code string received from the first communication line 410-*m* and a second code string received from the second communication line 510-*m* corresponding to the first code string, of a difference between the times at which the first code string and the second code string were received for each set is less than a time limit Tmax. Note that the time limit Tmax is, for example, 400 ms.

For example, the reception unit 221-*m* performs the following steps S221-21 to S221-24. The reception unit 221-*m* reads out the frame number for a predetermined number of first code strings after the reception of the first code string is started, measures the times at which the first code strings were received, and stores the frame numbers and the times at which the first code strings were received in association with each other in the storage unit (not shown) in the reception unit 221-*m* (step S221-21). Also, for the received second code string, the reception unit 221-*m* reads out the frame number, and if the read-out frame number matches one of the frame numbers stored in the storage unit, the reception unit 221-*m* measures the time of reception and stores the time at which the second code string was received in the storage unit in association with the frame number stored in the storage unit and the time at which the first code string was received (step S221-22). Next, the reception unit 221-*m* uses the frame number, the time at which the first code string was received, and the time at which the second code string was received, which were stored in association with the storage unit, to obtain the average value for the above-described predetermined number of values obtained by subtracting the time at which the first code string was received from the time at which the second code string was received for each frame number (step S221-23). Next, the reception unit 221-*m* determines whether or not the average value obtained in step S221-23 is less than the predetermined time limit Tmax (step S221-24).

Next, if the average value is less than the time limit Tmax in the above-described determination, for the frames thereafter, the reception unit 221-*m* outputs the monaural code included in the first code string input from the first communication line 410-*m* and the extended code with the closest frame number to that of the monaural code among the extended codes included in the second code string input from the second communication line 510-*m* to the decoding apparatus 222-*m*, and if the average value is not less than the time limit Tmax in the above-described determination, for the frames thereafter, the reception unit 221-*m* outputs the monaural code included in the first code string input from the first communication line 410-*m* to the decoding apparatus 222-*m*. If the average value is not less than the time limit Tmax in the above-described determination, the reception unit 221-*m* does not output the extended code for the frames thereafter. That is, if the average value is not less than the time limit Tmax in the above-described determination, the reception unit 221-*m* need only output only the monaural code.

That is, in a case in which the average value, for multiple sets each composed of a first code string received from the first communication line 410-*m* and a second code string received from the second communication line 510-*m* corresponding to the first code string, of a difference between the times at which the first code string and the second code string were received for each set is less than the predetermined time limit Tmax, for the frames thereafter, if the extended code having the same frame number as the monaural code (i.e., the monaural code in frame number order) included in the first code string input from the first communication line 410-*m* is included in the extended codes included in the second code string input from the second communication line 510-*m*, the reception unit 221-*m* outputs the monaural code and the extended code with the same frame number as the monaural code to the decoding apparatus 222-*m*, if the extended code with the same frame number as the monaural code (i.e., the monaural code in frame number order) included in the first code string input from the first communication line 410-*m* is not included in the extended codes included in the second code string input from the second communication line 510-*m*, the reception unit 221-*m* outputs the monaural code (i.e., the monaural code in frame number order) included in the first code string input from the first communication line 410-*m* and the extended code with the closest frame number to that of the monaural code among the extended codes included in the second code string input from the second communication line 510-*m* (i.e., an extended code that does not have the same frame number as the monaural code but has the closest frame number to that of the monaural code among the extended codes included in the second code string input from the second communication line 510-*m*) to the decoding apparatus 222-*m*, and in the case where the above-described average value is not less than the time limit Tmax, for the frames thereafter, the reception unit 221-*m* outputs only the monaural code (i.e., the monaural code in frame number order) included in the first code string input from the first communication line 410-*m* to the decoding apparatus 222-*m*.

Note that the reception unit 221-*m* may also not output anything until the above-described determination ends, may also output the monaural code and the extended code to the decoding apparatus 222-*m* similarly to the first embodiment, may also output the monaural code to the decoding apparatus 222-*m* without outputting the extended code, and may also output the monaural code to the decoding apparatus 222-*m* without fail and output the extended code to the decoding apparatus 222-*m* as well only if the difference in the frame number between the monaural code and the extended code is small, similarly to the fifth embodiment.

Decoding Apparatus 222-*m*

If the average value is less than the predetermined time limit Tmax in the above-described determination performed by the reception unit 221-*m*, the decoding apparatus 222-*m* receives input of the monaural code and the extended code for each frame similarly to the decoding apparatus 222-*m* of the first embodiment. On the other hand, if the average value is not less than the predetermined time limit Tmax in the above-described determination performed by the reception unit 221-*m*, the decoding apparatus 222-*m* receives input of the monaural code output by the reception unit 221-*m* and does not receive input of the extended code for each frame.

Note that until the above-described determination performed by the reception unit 221-*m* ends, the decoding apparatus 222-*m* does not receive any input, receives input of the monaural code without receiving input of the extended code, or receives input of the monaural code and the extended code. For each frame, the decoding apparatus 222-*m* obtains decoded digital sound signals of two channels corresponding to the input monaural code and extended code or to the input monaural code, and outputs them to the reproduction unit 223-*m*.

Extended Decoding Unit 2222-*m*

If the monaural decoded digital sound signal and the extended code were input, that is, if the average value is less than the time limit Tmax in the above-described determination, for each frame, the extended decoding unit 2222-*m* obtains the decoded digital sound signals of two channels through the same operation as the extended decoding unit 2222-*m* of the first embodiment based on the input monaural decoded digital sound signal and the extended code, and outputs the result to the reproduction unit 223-*m*. If the monaural decoded digital sound signal was input, that is, if the average value is not less than the predetermined time limit Tmax in the above-described determination, the extended decoding unit 2222-*m* obtains the input monaural decoded digital sound signal as-is as the decoded digital sound signals of two channels and outputs the result to the reproduction unit 223-*m*.

That is, if the average value, for multiple sets each composed of a first code string received from the first communication line 410-*m* and a second code string received from the second communication line 510-*m* corresponding to the first code string, of a difference between the times at which the first code string and the second code string were received for each set is less than the predetermined time limit Tmax, the decoding apparatus 222-*m* obtains and outputs the decoded digital sound signals of two channels based on the monaural code included in the first code string input from the first communication line 410-*m* and the extended code that is included in the second code string input from the second communication line 510-*m* and has the closest frame number to that of the monaural code, and if the above-described average value is not less than the time limit Tmax, the decoding apparatus 222-*m* obtains and outputs the monaural decoded digital sound signal obtained based on the monaural code included in the first code string input from the first communication line 410-*m* as-is as the two decoded digital sound signals of two channels.

More specifically, if the average value, for multiple sets each composed of a first code string received from the first communication line 410-*m* and a second code string received from the second communication line 510-*m* corresponding to the first code string, of a difference between the times at which the first code string and the second code string were received for each set is less than the predetermined time limit Tmax, for frames in which the extended code with the same frame number as the monaural code (i.e., the monaural code in frame number order) included in the first code string input from the first communication line 410-*m* is included in the extended codes included in the second code string input from the second communication line 510-*m*, the decoding apparatus 222-*m* obtains and outputs the decoded digital sound signals of two channels based on the monaural code and the extended code with the same frame number as the monaural code, and for frames in which the extended code with the same frame number as the monaural code (i.e., the monaural code in frame number order) included in the first code string input from the first communication line 410-*m* is not included in the extended codes included in the second code string input from the second communication line 510-*m*, the decoding apparatus 222-*m* obtains and outputs the two decoded digital sound signals of two channels based on the monaural code (i.e., the monaural code in frame number order) included in the first code string input from the first communication line 410-*m* and the extended code that is included in the second code string input from the second communication line 510-*m* and has the closest frame number to the monaural code (i.e., an extended code that does not have the same frame number as the monaural code but has the closest frame number to that of the monaural code among the extended codes included in the second code string input from the second communication line 510-*m*), and if the above-described average value is not less than the time limit Tmax, the decoding apparatus 222-*m* outputs the monaural decoded digital sound signal obtained based on the monaural code (i.e., the monaural code in frame number order) included in the first code string input from the first communication line 410-*m* as-is as the decoded digital sound signals of two channels.

Note that until the above-described determination performed by the reception unit 221-*m* ends, for the frames for which the monaural decoded digital sound signals and the extended code were input, the extended decoding unit 2222-*m* obtains the decoded digital sound signals of two channels through the same operation as the extended decoding unit 2222-*m* of the first embodiment based on the input monaural decoded digital sound signal and the extended code, and outputs the result to the reproduction unit 223-*m*, or the extended decoding unit 2222-*m* obtains the input monaural decoded digital sound signal as-is as the decoded digital sound signals of two channels and outputs the result to the reproduction unit 223-*m*, or outputs nothing.

Variation of Sixth Embodiment

Although the sound signal receiving side apparatus 220-*m* of a sixth embodiment based on the sound signal receiving side apparatus 220-*m* of the first embodiment and its operation were described above, it is also possible to perform operation by forming a sound signal receiving side apparatus 220-*m* of a sixth embodiment based on the sound signal receiving side apparatus 220-*m* of one of the third to fifth embodiments and their variations. Also, although the time from when reception of the first code string was started to when the predetermined number of first code strings were received was used as the predetermined time range in the above-described example, the predetermined time range may also be set using any time as the origin, and for example, a segment that is started from a given time after reception of the first code string has started may also be used as the predetermined time range, and respective segments started from multiple respective times after the reception of the first code string has been started may also be set as the predetermined time range.

Effects

As described in the fifth embodiment as well, even if the feature parameter has little temporal variation, there is a possibility that the value will differ significantly if the time differs significantly. Accordingly, if it has been determined that there is a time difference of such an extent that the feature parameter indicated by the extended code differs significantly between the first communication line and the second communication line, there is a possibility that a significant error has occurred in the division of the signal between the channels of the decoded sound signals of two channels in which the feature of the difference between the two channels has been reflected. According to the present sixth embodiment, if the difference between the time at which the first code string was received from the first communication line and the time at which the second code string was received from the second communication line for the same frame is large, a significant error in the divisions of the signals between the channels of the decoded sound signal can be suppressed by preventing a difference from being added to the decoded sound signals of two channels.

Seventh Embodiment

If the average value of the time difference is within the predetermined time limit based on the average value of the time differences between the first code strings input from the first communication line 410-*m* and the second code strings input from the second communication line 510-*m* with the same frame numbers as those of the first code strings, the time differences having been measured in a predetermined time range, the sound signal receiving side apparatus 220-*m* may also set the decoded digital sound signals of two channels using the monaural code and the extended code with the same frame number as the monaural code. This mode will be described as a seventh embodiment.

The seventh embodiment differs from the first embodiment in the operation of the reception unit 221-*m* of the sound signal receiving side apparatus 220-*m*. Hereinafter, the respects in which the seventh embodiment differs from the first embodiment will be described.

Reception Unit 221-*m*

The reception unit 221-*m* receives input of the first code string output by the sound signal transmitting side apparatus 210-*m*' that is at the conversation partner location from the first communication line 410-*m*, and receives input of the second code string output by the sound signal transmitting side apparatus 210-*m*' that is at the conversation partner location from the second communication line 510-*m*. Since the second communication line is a communication network with a low priority level, the reception unit 221-*m* normally receives input of the second code string of a given frame output by the sound signal transmitting side apparatus 210-*m*' that is at the conversation partner location from the second communication line 510-*m* after receiving input of the first code string of the frame from the first communication line 410-*m*.

First, the reception unit 221-*m* determines whether or not the average value, for multiple sets each composed of a first code string received from the first communication line 410-*m* and a second code string received from the second communication line 510-*m* corresponding to the first code string, of a difference between the times at which the first code string and the second code string were received for each set is less than the predetermined time limit Tmin Note that for example, the time limit Tmin is a value that is twice the frame length. That is, if the frame length is 20 ms, the time limit Tmin is, for example, 40 ms.

For example, the reception unit 221-*m* performs the following steps S221-31 to S221-34. The reception unit 221-*m* reads out the frame numbers for a predetermined number of first code strings after the reception of the first code string is started, measures the times at which the first code strings were received, and stores the frame numbers and the times at which the first code strings were received in association with each other in the storage unit (not shown) in the reception unit 221-*m* (step S221-31). Also, for the received second code string, the reception unit 221-*m* reads out the frame number, and if the read-out frame number matches one of the frame numbers stored in the storage unit, the reception unit 221-*m* measures the time of reception and stores the time at which the second code string was received in the storage unit in association with the frame number stored in the storage unit and the time at which the first code string was received (step S221-32). Next, the reception unit 221-*m* uses the frame numbers, the times at which the first code strings were received, and the times at which the second code strings were received, which were stored in association with the storage unit, to obtain the average value for the above-described predetermined number of values obtained by subtracting the time at which the first code string was received from the time at which the second code string was received for each frame number (step S221-33). Next, the reception unit 221-*m* determines whether or not the average value obtained in step S221-33 is the predetermined time limit Tmin (step S221-34).

Next, if the average value is less than the time limit Tmin in the above-described determination, for the frames thereafter, the reception unit 221-*m* outputs the monaural code included in the first code string input from the first communication line 410-*m* and the extended code with the same frame number as the monaural code among the extended codes included in the second code string input from the second communication line 510-*m* to the decoding apparatus 222-*m*, and if the average value is not less than the time limit Tmin in the above-described determination, for the frames thereafter, the reception unit 221-*m* outputs the monaural code included in the first code string input from the first communication line 410-*m* and the extended code with the closest frame number to that of the monaural code among the extended codes included in the second code string input from the second communication line 510-*m* to the decoding apparatus 222-*m*. However, after the first code string is received from the first communication line and before the second code string is received from the second communication line of that frame, it is envisioned that an amount of time corresponding to the average value obtained in step S221-33 upon finding the average will be needed, and therefore the reception unit 221-*m* needs to operate such that the amount of time from when the first code string is received from the first communication line 410-*m* to when the first code string is output to the decoding apparatus 222-*m* is the average value obtained in step S221-33 or a value greater there than.

That is, in the case where the average value, for multiple sets each composed of a first code string received from the first communication line 410-*m* and a second code string received from the second communication line 510-*m* corresponding to the first code string, of a difference between the times at which the first code string and the second code string were received for each set is less than the predetermined time limit Tmin, for frames thereafter, the reception unit 221-*m* outputs, to the decoding apparatus 222-*m*, the monaural code (i.e., the monaural code in frame number order) included in the first code string input from the first communication line 410-*m* and the extended code with the same frame number as the monaural code among the extended codes included in the second code string input from the second communication line 510-*m*, and in the case where the above-described average value is not less than the time limit Tmin, for frames thereafter, if the extended code with the same frame number as the monaural code (i.e., the monaural code in frame number order) included in the first code string input from the first communication line 410-*m* is included in the extended codes included in the second code string input from the second communication line 510-*m*, the reception unit 221-*m* outputs, to the decoding apparatus 222-*m*, the monaural code and the extended code with the same frame number as the monaural code, and if the extended code with the same frame number as the monaural code (i.e., the monaural code in frame number order) included in the first code string input from the first communication line 410-*m* is not included in the extended codes included in the second code string input from the second communication line 510-*m*, the reception unit 221-*m* outputs, to the decoding apparatus 222-*m*, the monaural code (i.e., the monaural code in frame number order) included in the first code string and the extended code that has the closest frame number to that of the monaural code among the extended codes included in the second code string input from the second communication line 510-*m* (i.e., an extended code that does not have the same frame number as the monaural code but has the closest frame number to the monaural code among the extended codes included in the second code string input from the second communication line 510-*m*).

The operation of the decoding apparatus 222-*m* of the sound signal receiving side apparatus 220-*m* of the seventh embodiment is the same as the operation of the decoding apparatus 222-*m* of the sound signal receiving side apparatus 220-*m* of the first embodiment, and the decoding apparatus 222-*m* obtains and outputs the decoded digital sound signals of two channels based on the monaural code output by the reception unit 221-*m* and the extended code output by the reception unit 221-*m*. However, since the extended code output by the reception unit 221-*m* of the seventh embodiment is different from the extended code output by the reception unit 221-*m* of the first embodiment depending on the case, the decoding apparatus 222-*m* specifically performs the following operation.

That is, if the average value, for multiple sets each composed of a first code string received from the first communication line 410-*m* and a second code string received from the second communication line 510-$m$ corresponding to the first code string, of a difference between the times at which the first code string and the second code string were received for each set is less than the predetermined time limit Tmin, the decoding apparatus 222-$m$ obtains and outputs the decoded digital sound signals of two channels based on the monaural code included in the first code string input from the first communication line 410-$m$ and the extended code that is included in the second code string input from the second communication line 510-$m$ and has the same frame number as the monaural code, and if the above-described average value is not less than the time limit Tmin, the decoding apparatus 222-$m$ obtains and outputs the decoded digital sound signals of two channels based on the monaural code included in the first code string input from the first communication line 410-$m$ and the extended code that is included in the second code string input from the second communication line 510-$m$ and has the closest frame number to that of the monaural code.

More specifically, if the average value, for multiple sets each composed of a first code string received from the first communication line 410-$m$ and a second code string received from the second communication line 510-$m$ corresponding to the first code string, of a difference between the times at which the first code string and the second code string were received for each set is less than the predetermined time limit Tmin, the decoding apparatus 222-$m$ obtains and outputs the decoded digital sound signals of two channels based on the monaural code (i.e., the monaural code in frame number order) included in the first code string input from the first communication line 410-$m$ and the extended code that is included in the second code string input from the second communication line 510-$m$ and has the same frame number as the monaural code, and if the above-described average value is not less than the time limit Tmin, for frames in which an extended code with the same frame number as the monaural code (i.e., the monaural code in frame number order) included in the first code string input from the first communication line 410-$m$ is included in the extended code included in the second code string input from the second communication line 510-$m$, the decoding apparatus 222-$m$ obtains and outputs the decoded digital sound signals of two channels based on the monaural code and the extended code with the same frame number as the monaural code, and for frames in which an extended code with the same frame number as the monaural code (i.e., the monaural code in frame number order) included in the first code string input from the first communication line 410-$m$ is not included in the extended code included in the second code string input from the second communication line 510-$m$, the decoding apparatus 222-$m$ obtains and outputs the decoded digital sound signals of two channels based on the monaural code (i.e., the monaural code in frame number order) included in the first code string input from the first communication line 410-$m$ and the extended code that is included in the second code string input from the second communication line 510-$m$ and has the closest frame number to the monaural code (i.e., an extended code that does not have the same frame number as the monaural code but has the closest frame number to the monaural code among the extended codes included in the second code string input from the second communication line 510-$m$).

Note that until the above-described determination performed by the reception unit 221-$m$ ends, for example, the reception unit 221-$m$ need only output the monaural code and the extended code to the decoding apparatus 222-$m$ similarly to the first embodiment, and the decoding apparatus 222-$m$ need only obtain the decoded digital sound signals of two channels using the monaural code and the extended code similarly to the first embodiment and output the result to the reproduction unit 223-$m$.

Variation of Seventh Embodiment

Although the sound signal receiving side apparatus 220-$m$ of a seventh embodiment based on the sound signal receiving side apparatus 220-$m$ of the first embodiment and its operation were described above, it is also possible to perform operation by forming a sound signal receiving side apparatus 220-$m$ of a seventh embodiment based on the sound signal receiving side apparatus 220-$m$ of one of the third to fifth embodiments and their variations. Also, although the time from when reception of the first code string was started to when the predetermined number of first code strings were received was used as the predetermined time range in the above-described example, the predetermined time range may also be set using any time as the origin, and for example, a segment that is started from a given time after reception of the first code string has started may also be used as the predetermined time range, and respective segments started from multiple respective times after the reception of the first code string has been started may also be set as the predetermined time range.

Effects

Even if the feature parameter has little temporal variation, if the time is different, there is a possibility that the value will be slightly different. Accordingly, if decoding is possible using the feature parameter of the same frame by merely increasing the delay slightly, it is possible to obtain a decoded sound signal of high sound quality. In view of this, in the present seventh embodiment, a time limit, which is a predetermined value, is provided to the average value of the predetermined time range of the difference between the time at which the first code string was received from the first communication line and the time at which the second code string was received from the second communication line for the same frame, and if it is less than the time limit, the delay is intentionally increased slightly, and the decoded sound signal of high sound quality is obtained by obtaining the decoded digital sound signals of two channels using the monaural code and the extended code with the same frame number as the monaural code.

Eighth Embodiment

If the average value of the time difference is less than a first time limit based on the average value of the time difference between the first code string input from the first communication line 410-$m$ and the second code string input from the second communication line 510-$m$ with the same frame number as the first code string, the time difference having been measured in a predetermined time range, the sound signal receiving side apparatus 220-$m$ may obtain the decoded digital sound signals of two channels using the monaural code and the extended code with the same frame number as the monaural code, if the average value of the time difference is at least a predetermined second time limit that is a greater than the first time limit, the sound signal receiving side apparatus 220-$m$ may use the decoded digital sound signal obtained by decoding the monaural code as the decoded digital sound signals of two channels, and if the average value of the time difference is at least the first time limit and less than the second time limit, the sound signal receiving side apparatus 220-*m* may also obtain the decoded digital sound signals of two channels using the monaural code and the extended code with the frame number that is the closest to that of the monaural code. In short, the sixth embodiment and the seventh embodiment may also be implemented in combination with each other. This mode will be described as an eighth embodiment.

The eighth embodiment differs from the first embodiment in the operation of the reception unit 221-*m* and the decoding apparatus 222-*m* of the sound signal receiving side apparatus 220-*m*. However, the operation of the decoding apparatus 222-*m* of the sound signal receiving side apparatus 220-*m* is the same as the operation of the decoding apparatus 222-*m* of the sixth embodiment. Hereinafter, the operation of the reception unit 221-*m*, by which the eighth embodiment differs from both the first embodiment and the sixth embodiment, will be described.

Reception Unit 221-*m*

The reception unit 221-*m* receives input of the first code string output by the sound signal transmitting side apparatus 210-*m'* that is at the conversation partner location from the first communication line 410-*m*, and receives input of the second code string output by the sound signal transmitting side apparatus 210-*m'* that is at the conversation partner location from the second communication line 510-*m*. Since the second communication line is a communication network with a low priority level, the reception unit 221-*m* normally receives input of the second code string of a given frame output by the sound signal transmitting side apparatus 210-*m'* that is at the conversation partner location from the second communication line 510-*m* after receiving input of the first code string of the frame from the first communication line 410-*m*.

First, the reception unit 221-*m* determines whether the average value, for multiple sets each composed of a first code string received from the first communication line 410-*m* and a second code string received from the second communication line 510-*m* corresponding to the first code string, of a difference between the times at which the first code string and the second code string were received for each set is less than the predetermined first time limit Tmin, is at least the predetermined second time limit Tmax that is greater than the first time limit Tmin, or is at least the first time limit Tmin and less than the second time limit Tmax. Note that for example, the first time limit Tmin is a value that is twice the frame length. That is, if the frame length is 20 ms, the first time limit Tmin is, for example, 40 ms. Also, the second time limit Tmax is, for example, 400 ms.

For example, the reception unit 221-*m* performs the following steps S221-41 to S221-44. The reception unit 221-*m* reads out the frame number for a predetermined number of first code strings after the reception of the first code string is started, measures the times at which the first code strings were received, and stores the frame numbers and the times at which the first code strings were received in association with each other in the storage unit (not shown) in the reception unit 221-*m* (step S221-41). Also, for the received second code string, the reception unit 221-*m* reads out the frame number, and if the read-out frame number matches one of the frame numbers stored in the storage unit, the reception unit 221-*m* measures the time of reception and stores the time at which the second code string was received in the storage unit in association with the frame number stored in the storage unit and the time at which the first code string was received (step S221-42). Next, the reception unit 221-*m* uses the frame number, the time at which the first code string was received, and the time at which the second code string was received, which were stored in association with the storage unit, to obtain the average value for the above-described predetermined number of values obtained by subtracting the time at which the first code string was received from the time at which the second code string was received for each frame number (step S221-43). Next, the reception unit 221-*m* determines whether the average value obtained in step S221-43 is less than the predetermined first time limit Tmin, is at least the predetermined second time limit Tmax that is greater than the first time limit Tmin, or is at least the first time limit Tmin and less than the second time limit Tmax (step S221-44).

Next, if the average value is less than the first time limit Tmin in the above-described determination, for the frames thereafter, the reception unit 221-*m* outputs, to the decoding apparatus 222-*m*, the monaural code included in the first code string input from the first communication line 410-*m* and an extended code with the same frame number as the monaural code among the extended codes included in the second code string input from the second communication line 510-*m*, if the average value is at least the first time limit Tmin and less than the second time limit Tmax in the above-described determination, for the frames thereafter, the reception unit 221-*m* outputs, to the decoding apparatus 222-*m*, the monaural code included in the first code string input from the first communication line 410-*m* and an extended code that is included in the second code string input from the second communication line 510-*m* and has the closest frame number to that of the monaural code, and if the average value is not less than the second time limit Tmax in the above-described determination, for the frames thereafter, the reception unit 221-*m* outputs the monaural code included in the first code string input from the first communication line 410-*m* to the decoding apparatus 222-*m*. If the average value is not less than the second time limit Tmax in the above-described determination, the reception unit 221-*m* does not output the extended code for the frames thereafter. That is, if the average value is not less than the second time limit Tmax in the above-described determination, the reception unit 221-*m* need only output only the monaural code. However, after the first code string is received from the first communication line and before the second code string is received from the second communication line of that frame, it is envisioned that an amount of time corresponding to the average value obtained in step S221-43 upon finding the average will be needed, and therefore the reception unit 221-*m* needs to operate such that the amount of time from when the first code string is received from the first communication line to when the first code string is output to the decoding apparatus 222-*m* is the average value obtained in step S221-43 or a value greater there than.

That is, in the case where the average value, for multiple sets each composed of a first code string received from the first communication line 410-*m* and a second code string received from the second communication line 510-*m* corresponding to the first code string, of a difference between the times at which the first code string and the second code string were received for each set is less than the predetermined time limit Tmin, for frames thereafter, the reception unit 221-*m* outputs, to the decoding apparatus 222-*m*, a monaural code (i.e., the monaural code in frame number order) included in the first code string input from the first communication line 410-*m* and an extended code with the same frame number as the monaural code among the extended codes included in the second code string input from the second communication line 510-$m$, in the case where the above-described average value is at least the first time limit Tmin and less than the second time limit Tmax, for frames thereafter, if an extended code with the same frame number as the monaural code (i.e., the monaural code in frame number order) included in the first code string input from the first communication line 410-$m$ is included in the extended codes included in the second code string input from the second communication line 510-$m$, the reception unit 221-$m$ outputs, to the decoding apparatus 222-$m$, the monaural code and an extended code with the same frame number as the monaural code, and if an extended code with the same frame number as the monaural code (i.e., the monaural code in frame number order) included in the first code string input from the first communication line 410-$m$ is not included in the extended codes included in the second code string input from the second communication line 510-$m$, the reception unit 221-$m$ outputs, to the decoding apparatus 222-$m$, the monaural code (i.e., the monaural code in frame number order) included in the first code string input from the first communication line 410-$m$ and an extended code that is included in the second code string input from the second communication line 510-$m$ and has the closest frame number to that of the monaural code (i.e., an extended code that does not have the same frame number as the monaural code but has the closest frame number to that of the monaural code among the extended codes included in the second code string input from the second communication line 510-$m$), and in the case where the above-described average value is not less than the second time limit Tmax, for frames thereafter, the reception unit 221-$m$ outputs, to the decoding apparatus 222-$m$, a monaural code (i.e., the monaural code in frame number order) included in the first code string input from the first communication line 410-$m$.

Note that until the above-described determination ends, the reception unit 221-$m$ may also not output anything, may also output the monaural code and the extended code to the decoding apparatus 222-$m$ similarly to the first embodiment, may also output the monaural code to the decoding apparatus 222-$m$ without outputting the extended code, and may also output the monaural code to the decoding apparatus 222-$m$ without fail and output the extended code to the decoding apparatus 222-$m$ as well only if the difference in the frame number between the monaural code and the extended code is small, similarly to the fifth embodiment.

The operation of the decoding apparatus 222-$m$ of the sound signal receiving side apparatus 220-$m$ of the eighth embodiment is the same as the operation of the decoding apparatus 222-$m$ of the sound signal receiving side apparatus 220-$m$ of the sixth apparatus. However, depending on the case, the extended codes output by the reception unit 221-$m$ of the eighth embodiment differ from the extended codes output by the reception unit 221-$m$ of the sixth embodiment, and therefore the decoding apparatus 222-$m$ specifically performs the following operation.

That is, in the case where the average value is less than the first time limit Tmin in the above-described determination and in the case where the average value is at least the first time limit Tmin and less than the second time limit Tmax in the above-described determination, for the frames thereafter, the decoding apparatus 222-$m$ obtains and outputs the decoded digital sound signals of two channels based on the monaural code output by the reception unit 221-$m$ and the extended code output by the reception unit 221-$m$, and in the case where the average value is at least the second time limit Tmax in the above-described determination, for the frames thereafter, the decoding apparatus 222-$m$ outputs the monaural decoded digital sound signals based on the monaural code output by the reception unit 221-$m$ as-is as the decoded digital sound signals of two channels.

More specifically, in the case where the average value, for multiple sets each composed of a first code string received from the first communication line 410-$m$ and a second code string received from the second communication line 510-$m$ corresponding to the first code string, of a difference between the times at which the first code string and the second code string were received for each set is less than the predetermined first time limit Tmin, the decoding apparatus 222-$m$ obtains and outputs the decoded digital sound signals of two channels based on the monaural code included in the first code string input from the first communication line 410-$m$ and an extended code that is included in the second code string input from the second communication line 510-$m$ and has the same frame number as the monaural code, in the case where the above-described average value is at least the predetermined second time limit Tmax that is greater than the first time limit Tmin, the decoding apparatus 222-$m$ outputs the monaural decoded digital sound signal based on the monaural code included in the first code string input from the first communication line 410-$m$ as-is as the decoded digital sound signals of two channels, and in the case where the above-described average value is at least the first time limit Tmin and less than the second time limit Tmax, the decoding apparatus 222-$m$ obtains and outputs the decoded digital sound signals of two channels based on the monaural code included in the first code string input from the first communication line 410-$m$ and an extended code that is included in the second code string input from the second communication line 510-$m$ and has the closest frame number to that of the monaural code.

More specifically, in the case where the average value, for multiple sets each composed of a first code string received from the first communication line 410-$m$ and a second code string received from the second communication line 510-$m$ corresponding to the first code string, of a difference between the times at which the first code string and the second code string were received for each set is less than the predetermined first time limit Tmin, the decoding apparatus 222-$m$ obtains and outputs the decoded digital sound signals of two channels based on the monaural code (i.e., the monaural code in frame number order) included in the first code string input from the first communication line 410-$m$ and an extended code that is included in the second code string input from the second communication line 510-$m$ and has the same frame number as the monaural code, in the case where the above-described average is at least the predetermined second time limit Tmax that is greater than the first time limit Tmin, the decoding apparatus 222-$m$ outputs the monaural decoded digital sound signal obtained based on the monaural code (i.e., the monaural code in frame number order) included in the first code string input from the first communication line 410-$m$ as-is as the decoded digital sound signals of two channels, and in the case where the above-described average is at least the first time limit Tmin and less than the second time limit Tmax, for frames in which an extended code with the same frame number as the monaural code (i.e., the monaural code in frame number order) included in the first code string input from the first communication line 410-$m$ is included in the extended codes included in the second code string input from the second communication line 510-$m$, the decoding apparatus 222-$m$ obtains and outputs the decoded digital sound signals of two channels based on the monaural code and an extended code with the same frame number as the monaural code, and for frames in which an extended code with the same frame number as the monaural code (i.e., the monaural code in frame number order) included in the first code string input from the first communication line 410-$m$ is not included in the extended codes included in the second code string input from the second communication line 510-$m$, the decoding apparatus 222-$m$ obtains and outputs the decoded digital sound signals of two channels based on the monaural code (i.e., the monaural code in frame number order) included in the first code string input from the first communication line 410-$m$ and an extended code that is included in the second code string input from the second communication line 510-$m$ and has the closest frame number to that of the monaural code (i.e., an extended code that does not have the same frame number as the monaural code but has the closest frame number to that of the monaural code among the extended codes included in the second code string input from the second communication line 510-$m$).

Note that until the above-described determination performed by the reception unit 221-$m$ ends, the decoding apparatus 222-$m$ does not receive any input, receives input of the monaural code without receiving input of the extended code, or receives input of the monaural code and the extended code. For each frame, the decoding apparatus 222-$m$ obtains decoded digital sound signals of two channels corresponding to the input monaural code and extended code or the input monaural code, and outputs them to the reproduction unit 223-$m$.

Variation of Eighth Embodiment

Although the sound signal receiving side apparatus 220-$m$ of an eighth embodiment based on the sound signal receiving side apparatus 220-$m$ of the first embodiment and its operation were described above, it is also possible to perform operation by forming a sound signal receiving side apparatus 220-$m$ of the eighth embodiment based on the sound signal receiving side apparatus 220-$m$ of one of the third to fifth embodiments and their variations. Also, although the time from when reception of the first code string was started to when the predetermined number of first code strings were received was used as the predetermined time range in the above-described example, the predetermined time range may be set to any time, and for example, a segment that is started from a given time after reception of the first code string has started may also be used as the predetermined time range, and respective segments started from multiple respective times after the reception of the first code string has been started may also be set as the predetermined time range.

Effects

According to the present eighth embodiment, it is possible to suppress significant errors in the division of signals between the channels of the decoded sound signals obtained when the difference between the time at which the first code string was received from the first communication line and the time at which the second code string was received from the second communication line for the same frame is large, and decoded sound signals of high sound quality can be obtained when the above-described difference is small.

Ninth Embodiment

In a multipoint control unit (MCU) for performing teleconferencing at multiple locations, an operation similar to that of the sound signal transmitting side apparatus 210-$m$ of the above-described embodiments may also be performed using the digital sound signals corresponding to the respective sound signals of two different locations as the digital sound signals of two channels. This mode will be described as a ninth embodiment.

Multipoint Control Apparatus 600

Figure 7:
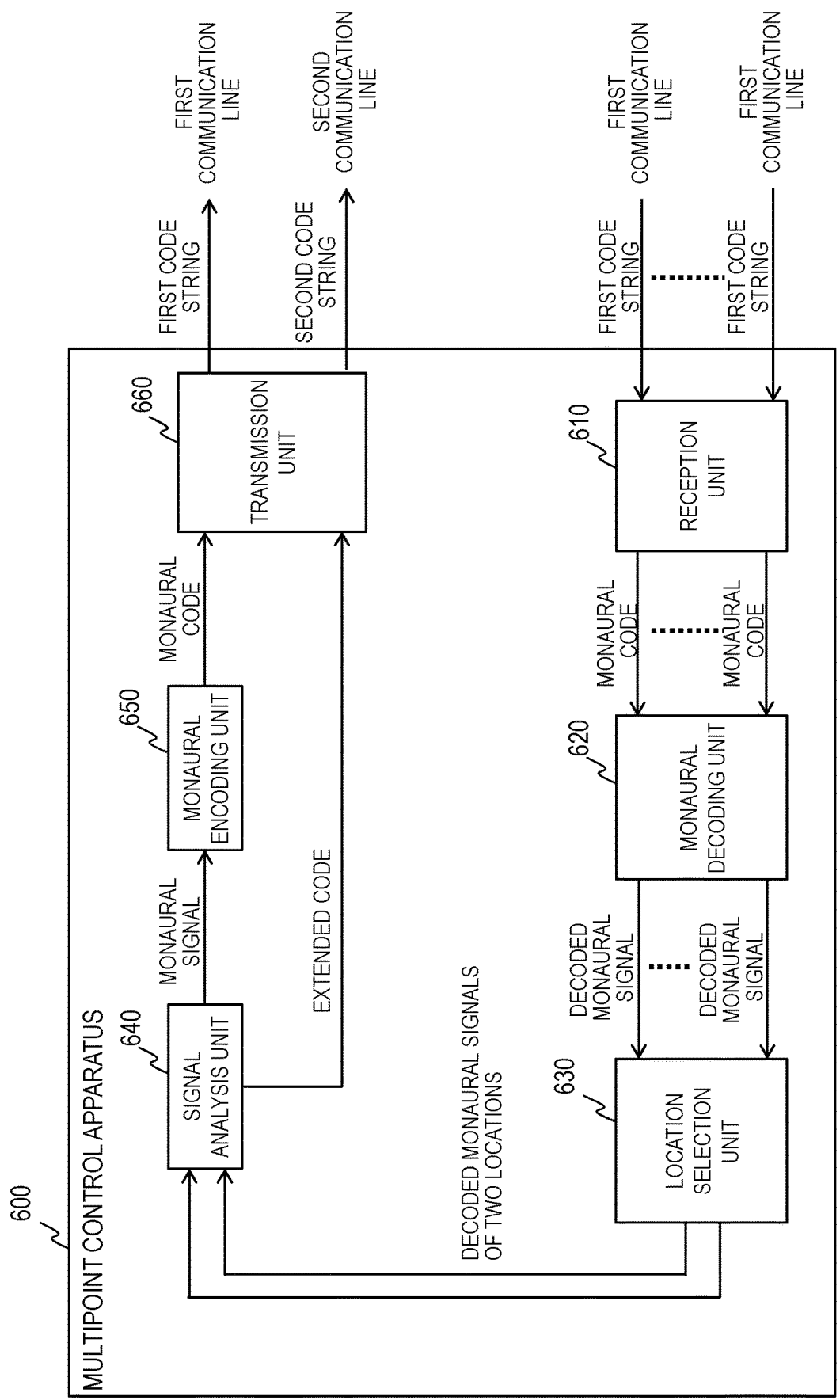
FIG. 7 is a block diagram showing an example of a multipoint control apparatus.
Figure 8:
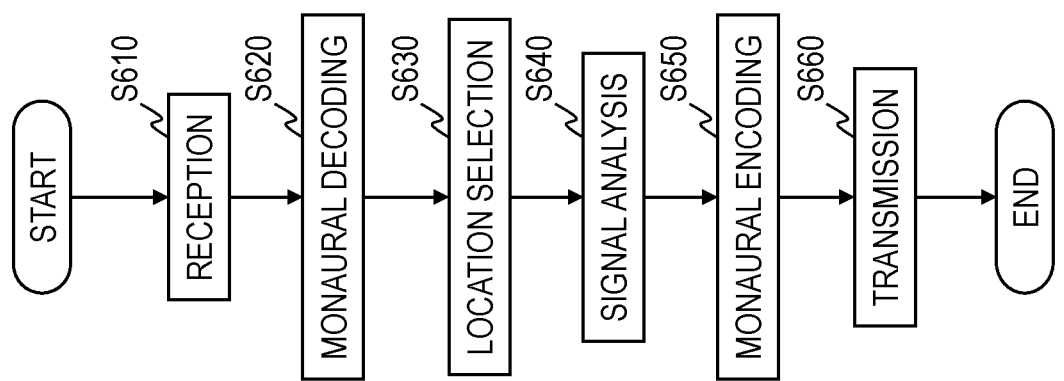
FIG. 8 is a flowchart showing an example of a processing of a multipoint control apparatus.

As shown in FIG. 7, the multipoint control apparatus 600 includes a reception unit 610, a monaural decoding unit 620, a location selection unit 630, a signal analysis unit 640, a monaural encoding unit 650, and a transmission unit 660. Hereinafter, description will be given using an example in which terminal apparatuses of P locations (P being an integer that is at least 3) are connected to the multipoint control apparatus 600 and sound signals of at most two locations among the P−1 locations of a location $m_2$ to a location $m_P$ are transmitted to the multiple-line-compatible terminal apparatus 200-$m_1$. For each frame, which is, for example, a predetermined time segment of 20 ms, the multipoint control apparatus 600 performs processing of steps S610 to S660 that are illustrated in FIG. 8 and in the description below.

Reception Unit 610

The reception unit 610 receives input of P−1 first code strings output by a multiple-line-compatible terminal apparatus 200-$m_{else}$ (else being an integer that is at least 2 and at most P) via the first communication line. The reception unit 610 outputs, to the monaural decoding unit 620, the monaural codes included in the respective input P−1 first code strings (step S610).

Monaural Decoding Unit 620

The monaural decoding unit 620 decodes the respective P−1 monaural codes input from the reception unit 610 using the predetermined decoding scheme to obtain the decoded monaural signal, which is a monaural decoded digital sound signal, and outputs the result to the location selection unit 630 (step S620). The predetermined decoding scheme is as described in the first embodiment.

Location Selection Unit 630

The location selection unit 630 selects the two decoded monaural signals among the P−1 decoded monaural signals input from the monaural decoding unit 620 based on a predetermined selection reference and outputs the result to the signal analysis unit 640 (step S630). A reference according to which it is possible to select the decoded monaural signal of a location with a high degree of importance need only be set in advance as the predetermined selection reference, and the location selection unit 630 need only be able to execute selection. For example, if the power of the sound signal is to be used as the selection reference, for each frame, the location selection unit 630 outputs the decoded monaural signal with the greatest power and the decoded monaural signal with the second-greatest power among the input P−1 decoded monaural signals to the signal analysis unit 640.

Signal Analysis Unit 640

The signal analysis unit 640 obtains the monaural signal, which is a signal obtained by mixing two input decoded monaural signals, based on the two input decoded monaural signals, outputs the result to the monaural encoding unit 650, and obtains an extended code indicating the feature parameter, which is a parameter indicating a feature of a difference between the two input decoded monaural signals and is a parameter with little temporal variation, and outputs the result to the transmission unit 660 (step S640). The signal analysis unit 640 need only perform the same operation as the signal analysis unit 2121-$m$ of the encoding apparatus 212-$m$ of the sound signal transmitting side apparatus 210-$m$ of the multiple-line-compatible terminal apparatus 200-$m$ of the first embodiment. However, in the case of the present ninth embodiment, due to the fact that the two input decoded monaural signals correspond to sound signals generated at the respective different locations, it is better to use information indicating an intensity difference for each frequency band shown in the second example than information indicating a time difference shown in the first example of the signal analysis unit 2121-$m$ as the feature parameter. Note that information indicating a ratio or a difference between powers of the two input decoded monaural signals may also be used as a feature parameter.

Monaural Encoding Unit 650

The monaural encoding unit 650 encodes the input monaural signal using a predetermined encoding scheme to obtain a monaural code, and outputs the obtained monaural code to the transmission unit 660 (step S650). The predetermined encoding scheme is as described in the first embodiment.

Transmission Unit 660

For each frame, the transmission unit 660 outputs the first code string, which is a code string including the monaural codes input from the monaural encoding unit 650, to the multiple-line-compatible terminal apparatus 200-$m_1$ via the first communication line, and outputs a second code string, which is a code string including the extended codes input from the signal analysis unit 640, to the multiple-line-compatible terminal apparatus 200-$m_1$ via the second communication line (step S660).

Effects

By causing the multipoint control apparatus 600 to perform the operation of the present ninth embodiment, it is possible to reproduce the sound signals of two locations by virtually allocating them to the left and right in the multiple-line-compatible terminal apparatus 200-$m_1$, and it is possible to make an utterance performed at any location or an utterance performed at another location clear.

Variation of Ninth Embodiment

In the location selection unit 630 of the multipoint control apparatus 600 of the ninth embodiment, due to the fact that the two decoded monaural signals have been selected using power, the extended code may also be obtained by the location selection unit 630 instead of the signal analysis unit 640. This mode is used as a variation of the ninth embodiment to describe points that differ from the ninth embodiment.

Multipoint Control Apparatus 600

Figure 9:
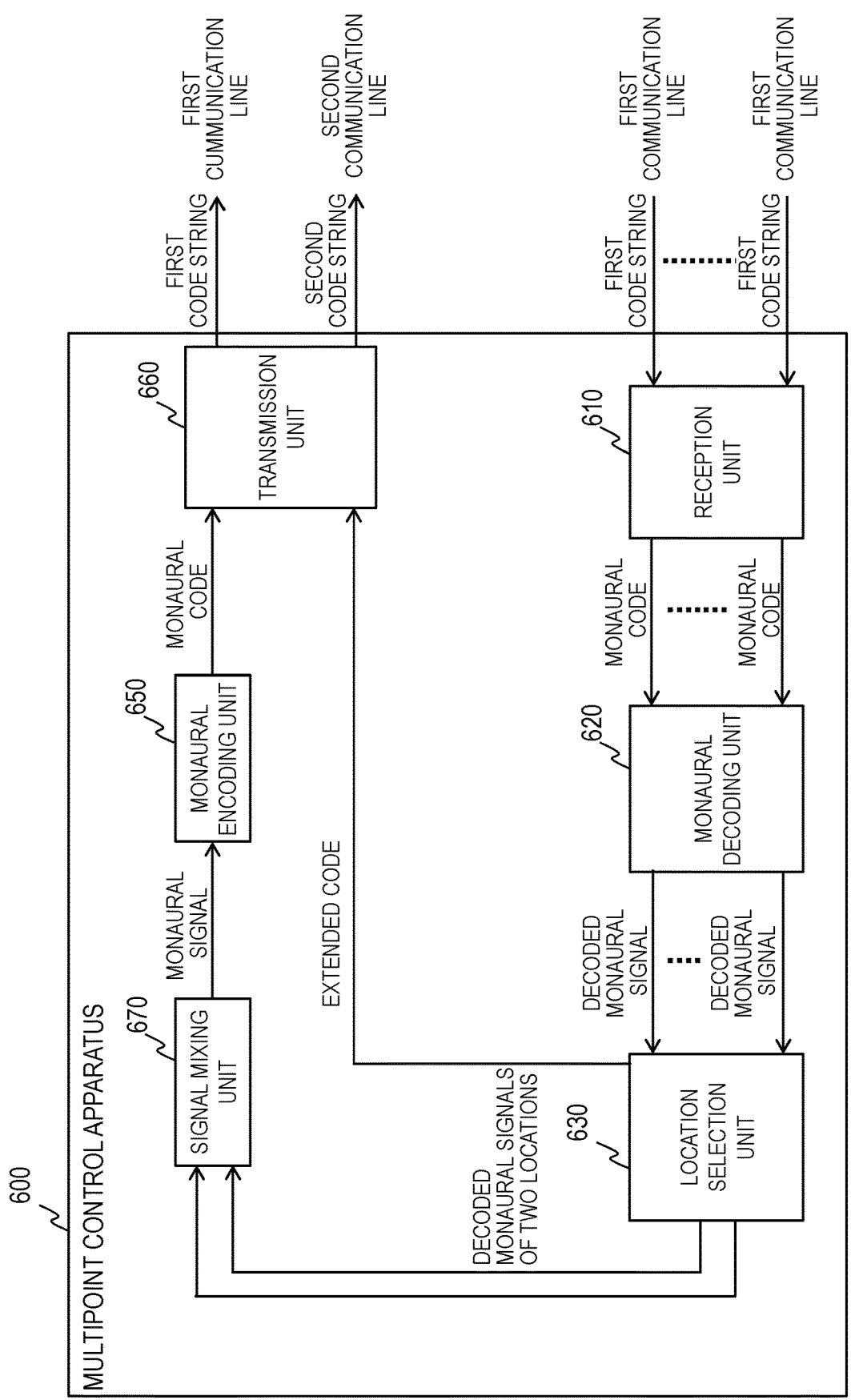
FIG. 9 is a block diagram showing an example of a multipoint control apparatus.
Figure 10:
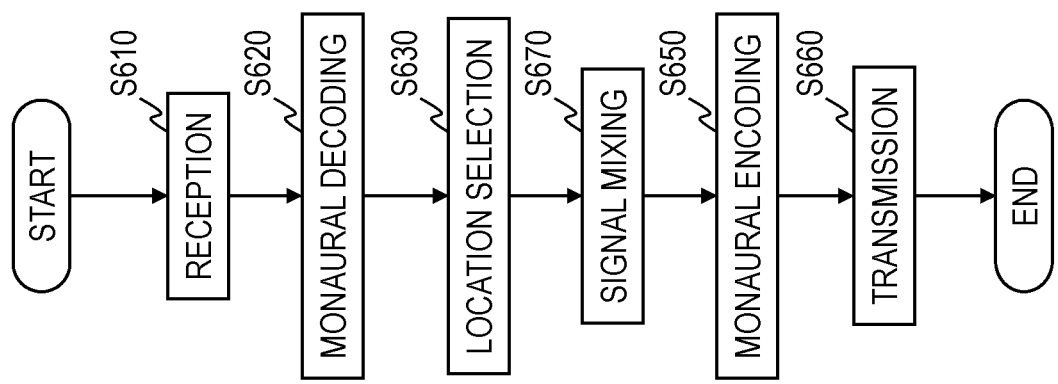
FIG. 10 is a flowchart showing an example of processing of a multipoint control apparatus.

As shown in FIG. 9, the multipoint control apparatus 600 of the variation of the ninth embodiment includes a signal mixing unit 670 instead of the signal analysis unit 640 included in the multipoint control apparatus 600 of the ninth embodiment. The multipoint control apparatus 600 performs the processing of steps S610 to S630, step S670, and steps S650 to S660, which are illustrated in FIG. 10, for each frame. Among these, step S630, which is performed by the location selection unit 630, and step S670, which is performed by the signal mixing unit 670, are substantially different from the ninth embodiment. Step S660, which is performed by the transmission unit 660, is the same as in the ninth embodiment, except that the extended code is input from the location selection unit 630 instead of the signal analysis unit 640.

Location Selection Unit 630

The location selection unit 630 selects the decoded monaural signal with the greatest power and the decoded monaural signal with the second-greatest power among the P−1 decoded monaural signals input from the monaural decoding unit 620 and outputs them to the signal analysis unit 640, and further obtains the ratio or difference between the powers of the two selected decoded monaural signals as the feature parameter, obtains an extended code, which is a code that indicates an obtained feature parameter, and outputs the extended code to the transmission unit 660 (step S630).

Signal Mixing Unit 670

The signal mixing unit 670 obtains the monaural signal, which is a signal obtained by mixing the two input decoded monaural signals, based on the two input decoded monaural signals and outputs them to the monaural encoding unit 650 (step S670).

Note that in order to emphasize the virtual division to the left and right of the sound signals of two locations in the multiple-line-compatible terminal apparatus 200-$m_1$, the location selection unit 630 may also obtain information specifying the location with the greater power among the two selected decoded monaural signals as the feature parameter, obtain the extended code, which is a code indicating the feature parameter, and output the extended code to the transmission unit 660. In this case, in the extended decoding unit 2222-$m_1$ of the decoding apparatus 222-$m_1$ of the sound signal receiving side apparatus 220-$m_1$ of the multiple-line-compatible terminal apparatus 200-$m_1$, the decoded digital sound signals of two channels need only be obtained such that the sound signals are localized to predetermined left and right positions for each location. In this case, the signal mixing unit 670 may also select the decoded monaural signal with the greater power among the two input decoded monaural signals and output them to the monaural encoding unit 650, and the location selection unit 630 may also select and output only one decoded monaural signal that has the greatest power, without originally including the signal mixing unit 670.

Tenth Embodiment

In the above-described embodiments and the variations, in order to simplify the description, description was given using an example in which sound signals of two channels of the multiple-line-compatible terminal apparatus 200-$m$ are handled. However, there is no limitation to the number of channels, and the number of channels need only be at least 2. When the number of channels is set to C (C being an integer that is at least 2), the above-described embodiments and variations can be implemented with the two channels replaced with C (C being an integer that is at least 2) channels.

For example, a sound collection unit 211-$m$ of the sound signal transmitting side apparatus 210-$m$ of the multiple-line-compatible terminal apparatus 200-$m$ need only be set to include C microphones and C AD conversion units, and the encoding apparatus 212-$m$ of the sound signal transmitting side apparatus 210-$m$ of the multiple-line-compatible terminal apparatus 200-$m$ need only be set to include the monaural code and the extended code based on the input digital sound signals of C channels. Specifically, the encoding apparatus 212-$m$ need only encode a signal obtained by mixing the input digital sound signals of the C channels using a predetermined first encoding scheme to obtain a monaural code, and obtain an extended code that includes a code indicating information that corresponds to the difference between the channels of the input digital sound signals of the C channels. The information corresponding to the difference between the channels of the digital sound signals of the C channels is, for example, information corresponding to the difference between a digital sound signal of a channel and a digital sound signal of a channel serving as a reference for each of the C−1 channels other than the channel serving as a reference.

Also, the decoding apparatus 222-$m$ of the sound signal receiving side apparatus 220-$m$ of the multiple-line-compatible apparatus 200-$m$ need only obtain and output the decoded digital sound signals of C channels based on the input monaural code and the extended code. Specifically, the monaural decoding unit 2221-$m$ of the decoding apparatus 222-$m$ decodes the input monaural code to obtain the monaural decoded digital sound signal, and the extended decoding unit 2222-$m$ of the decoding apparatus 222-$m$ need only obtain and output the decoded digital sound signals of the C channels, assuming that the monaural decoded digital sound signal is a signal obtained by mixing the decoded digital sound signals of the C channels, and assuming that the feature parameter obtained based on the input extended code is information indicating a feature of a difference between the channels of the decoded digital sound signals of C channels. Also, in this case, the reproduction unit 223-$m$ of the sound signal receiving side apparatus 220-$m$ of the multiple-line terminal apparatus 200-$m$ may also include a maximum of C DA conversion units and a maximum of C speakers.

Other Embodiments

{{Mode in which telephone-line-dedicated terminal apparatus is also included in telephone system} }

If a telephone-line-dedicated terminal apparatus 300-$n$ is also included in the telephone system 100, the telephone-line-dedicated terminal apparatus 300-$n$ performs a known operation as follows.

Telephone-Line-Dedicated Terminal Apparatus 300-$n$

Figure 11:
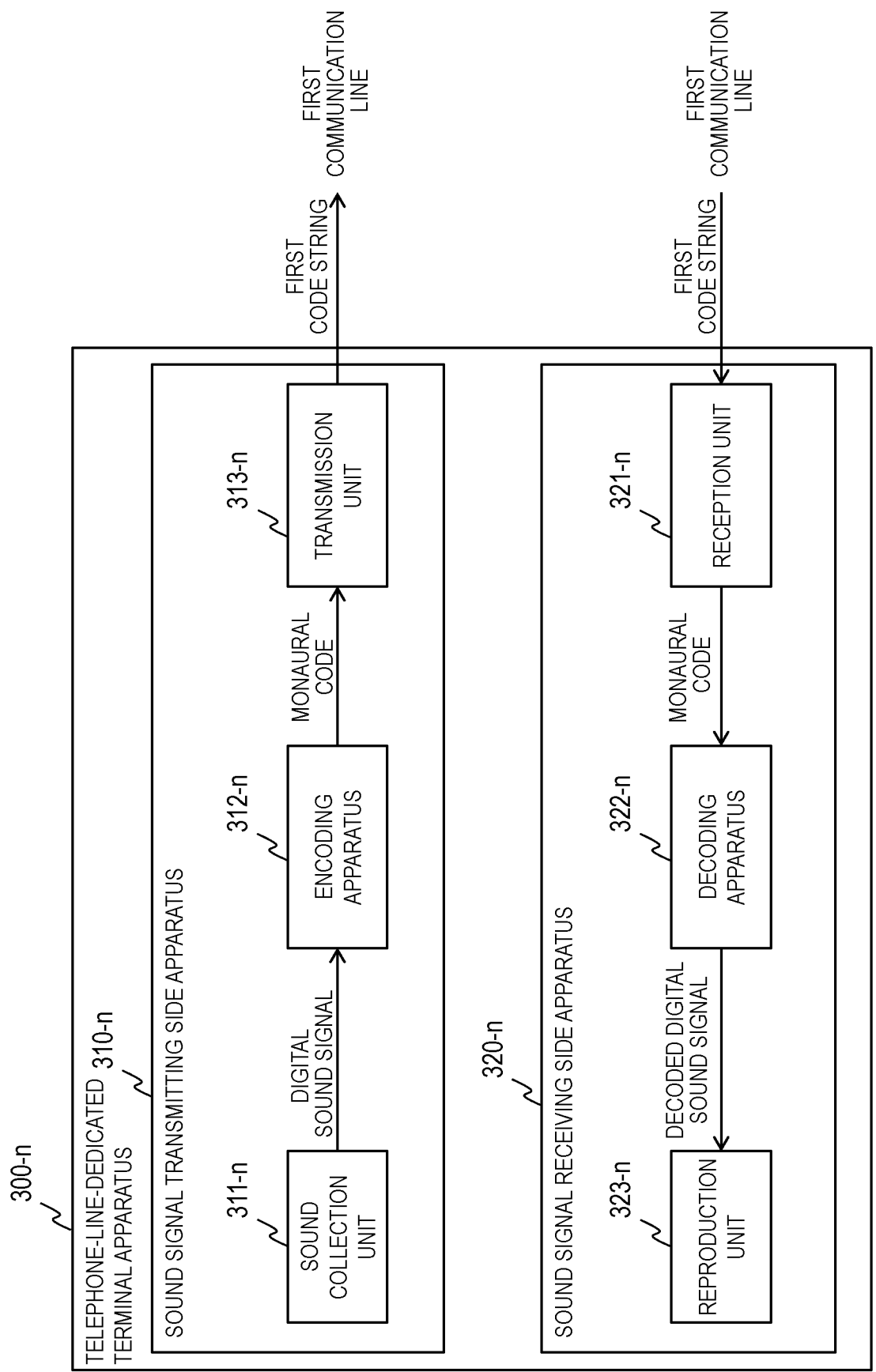
FIG. 11 is a block diagram showing an example of a telephone-line-dedicated terminal apparatus.
Figure 12:
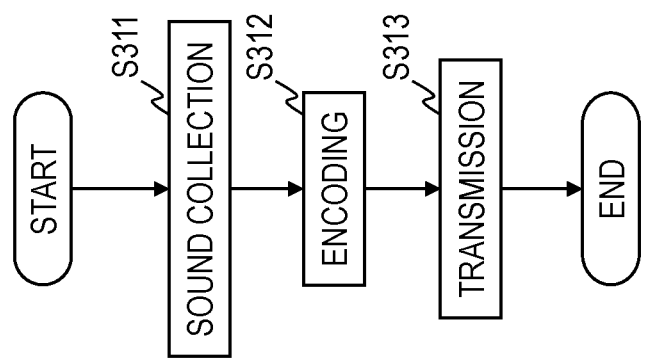
FIG. 12 is a flowchart showing an example of processing of a sound signal transmitting side apparatus of a telephone-line-dedicated terminal apparatus.
Figure 13:
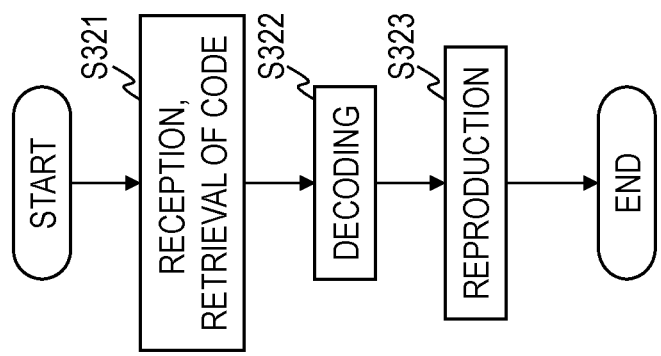
FIG. 13 is a flowchart showing an example of processing of a sound signal receiving side apparatus of a telephone-line-dedicated terminal apparatus.

The telephone-line-dedicated terminal apparatus 300-$n$ is, for example, a conventional mobile telephone or a conventional smartphone, and as shown in FIG. 11, includes the sound signal transmitting side apparatus 310-$n$ and the sound signal receiving side apparatus 320-$n$. The sound signal transmitting side apparatus 310-$n$ includes a sound collection unit 311-$n$, an encoding apparatus 312-$n$, and a transmission unit 313-$n$. The sound signal receiving side apparatus 320-$n$ includes a reception unit 321-$n$, a decoding apparatus 322-$n$, and a reproduction unit 323-$n$. The sound signal transmitting side apparatus 310-$n$ of the telephone line dedicated terminal apparatus 300-$n$ performs the processing of steps S311 to S313, which are illustrated in FIG. 12 and below, and the sound signal receiving side apparatus 320-$n$ of the telephone line dedicated terminal apparatus 300-$n$ performs the processing of steps S321 to S323, which are illustrated in FIG. 13 and below.

Sound Signal Transmitting Side Apparatus 310-$n$

For example, for each predetermined time segment of 20 ms, that is, for each frame, the sound signal transmitting side apparatus 310-$n$ obtains the first code string, which is a code string including the monaural code corresponding to the digital sound signal of one channel and outputs it to the first communication line 420-$n$.

Sound Collection Unit 311-$n$

The sound collection unit 311-$n$ includes one microphone and one AD conversion unit. The microphone collects sound generated in the spatial region of the surrounding area of the microphone, converts the sound into an analog electrical signal, and outputs the analog electrical signal to the AD conversion unit. The AD conversion unit converts the input analog electrical signal into, for example, a digital sound signal, which is a PCM signal with a sampling frequency of 8 kHz, and outputs the result. That is, the sound collection unit 311-$n$ outputs the digital sound signal of one channel corresponding to the sound collected by the one microphone to the encoding apparatus 312-$n$ (step S311).

Encoding Apparatus 312-$n$

For each frame, the encoding apparatus 312-$n$ encodes the digital sound signal of one channel input from the sound collection unit 311-$n$ using the above-described predetermined encoding scheme to obtain the monaural code, and outputs the result to the transmission unit 313-$n$ (step S312).

Transmission Unit 313-$n$

For each frame, the transmission unit 313-$n$ outputs the first code string, which is a code string that includes a monaural code input from the encoding apparatus 312-$n$ to the first communication line 420-$n$ (step S313).

Sound Signal Receiving Side Apparatus 320-$n$

For example, for each predetermined time segment of 20 ms, that is, for each frame, the sound signal receiving side apparatus 320-$n$ outputs a sound obtained based on the monaural code included in the first code string input from the first communication line 420-$n$.

Reception Unit 321-$n$

For each frame, the reception unit 321-$n$ outputs the monaural code included in the first code string input from the first communication line 420-$n$ to the decoding apparatus 322-$n$ (step S321).

Decoding Apparatus 322-$n$

For each frame, the decoding apparatus 322-$n$ receives input of the monaural code output by the reception unit 321-$n$. For each frame, the decoding apparatus 322-$n$ decodes the input monaural code using the above-described predetermined decoding scheme to obtain one decoded digital sound signal, and outputs the result to the reproduction unit 323-$n$ (step S322).

Reproduction Unit 323-$n$

The reproduction unit 323-$n$ outputs sound corresponding to the one input decoded digital sound signal (step S323).

The reproduction unit 323-$n$ includes, for example, one DA conversion unit and one speaker. The DA conversion unit converts the input decoded digital sound signal into an analog electrical signal and outputs the result. The speaker generates sound corresponding to the analog electrical signal input from the DA conversion unit. The speakers may also be included in stereo headphones or stereo earphones. If the speakers included in the stereo headphones or the stereo earphones, that is, two speakers, are to be used, for example, the reproduction unit 323-$n$ inputs the electrical signals output by the DA conversion unit to the two speakers and a sound corresponding to the one decoded digital sound signal (decoded sound signal) is generated from the two speakers.

Effects

Due to the fact that the encoding scheme and the decoding scheme that are the same as those of the multiple-line-compatible terminal apparatus 200-$m$ are used also in the telephone-line-dedicated terminal apparatus 300-$n$, in the telephone-line-dedicated terminal apparatus 300-$n$, the compatibility is ensured such that the decoded sound signal of the minimum sound quality can be obtained, and the multiple-line-compatible terminal apparatus 200-$m$ can obtain the decoded sound signal of the high sound quality with a delay time that is approximately the same as that in the case of obtaining the decoded sound signal of the minimum sound quality, that is, with a delay time according to which there is no sense of discomfort during a two-way conversation.

{{Mode in which there is Also a Code that is Neither a Monaural Code Nor an Extended Code}}

The sound signal transmitting side apparatus 210-$m$ of the multiple-line-compatible terminal apparatus 200-$m$ may also obtain and output a code (additional code) that is neither the above-described monaural code nor the above-described extended code. Specifically, the encoding apparatus 212-$m$ may also obtain the additional code and output it to the transmission unit 213-$m$, and the transmission unit 213-$m$ may also output the additional code input from the encoding apparatus 212-$m$ to one of the first communication line 410-$m$ and the second communication line 510-$m$. For example, the additional code is a code that indicates the feature of the high-band component of the signal obtained by mixing the input digital sound signals of C (C being an integer that is at least 2) channels.

Similarly, the sound signal receiving side apparatus 220-$m$ of the multiple-line-compatible terminal apparatus 200-$m$ may also receive input of the code (additional code) that is neither the above-described monaural code nor the above-described extended code, and the sound signal receiving side apparatus 220-$m$ of the multiple-line-compatible terminal apparatus 200-$m$ may also obtain and output the decoded sound signal using the additional code as well. Specifically, the reception unit 221-$m$ may also output the additional code input from one of the first communication line 410-$m$ and the second communication line 510-$m$ to the decoding apparatus 222-$m$, and the decoding apparatus 222-$m$ may also obtain the decoded sound signal using the additional code input from the reception unit 221-$m$ as well.

Program and Storage Medium

Figure 14:
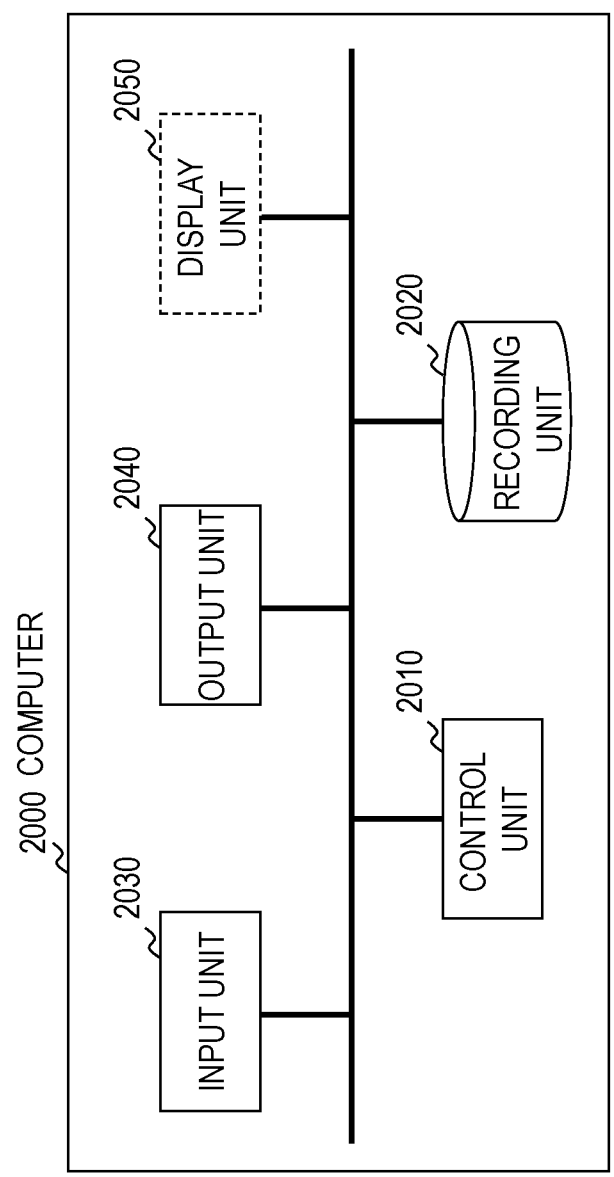
FIG. 14 is a diagram showing an example of a functional configuration of a computer for realizing the apparatuses of an embodiment of the present invention.

The processing of the units of the multiple-line-compatible terminal apparatus 200-$m$ may also be realized using a computer. In other words, the processing of the steps of the encoding method performed by the multiple-line-compatible terminal apparatus 200-$m$ and the decoding method performed by the multiple-line-compatible terminal apparatus 200-$m$ may also be realized using a computer. In this case, the processing of the steps is described by the program. Also, the processing of the steps is realized on the computer by executing the program using the computer. FIG. 14 is a diagram showing an example of a functional configuration of a computer for realizing the above-described processing. The processing can be implemented by causing a recording unit 2020 to load a program for causing the computer to function as the above-described apparatuses, and causing a control unit 2010, an input unit 2030, an output unit 2040, and the like to operate.

The respective programs describing the processing content can be recorded in a computer-readable recording medium. For example, any computer-readable recording medium, such as a magnetic recording apparatus, an optical disk, a magneto-optical recording medium, or a semiconductor memory, may be used.

Also, the processing of each unit may also be constituted by causing the predetermined program to function on the computer, and at least a portion of this processing may also be realized using hardware.

In addition, it goes without saying that changes are possible as appropriate without departing from the gist of the invention.

The invention claimed is:

1. A sound signal receiving and decoding method to be performed by a terminal apparatus connected to a first communication line and a second communication line with a lower priority level than the first communication line, the method comprising:
a reception step of determining whether or not an average value, for a plurality of sets each composed of a first code string received from the first communication line and a second code string received from the second communication line corresponding to the first code string, of a difference between times at which the first code string and the second code string were received for each set is less than a predetermined time limit Tmin,
if the average value is less than the time limit Tmin in the determination, for a frame after the determination, outputting a monaural code included in the first code string input from the first communication line and an extended code having the same frame number as the monaural code among extended codes included in the second code string input from the second communication line, and
if the average value is not less than the time limit Tmin in the determination, for a frame after the determination, outputting the monaural code included in the first code string input from the first communication line and an extended code having the closest frame number to that of the monaural code among the extended codes included in the second code string input from the second communication line; and a decoding step of, for a frame after the determination, obtaining and outputting decoded digital sound signals of C (C being an integer that is at least 2) channels based on the monaural code output in the reception step and the extended code output in the reception step.

2. A sound signal receiving and decoding method to be performed by a terminal apparatus connected to a first communication line and a second communication line with a lower priority level than the first communication line, the method comprising:
   a reception step of determining whether or not an average value, for a plurality of sets each composed of a first code string received from the first communication line and a second code string received from the second communication line corresponding to the first code string, of a difference between times at which the first code string and the second code string were received for each set is less than a predetermined time limit Tmax,
      if the average value is less than the time limit Tmax in the determination, for a frame after the determination, outputting a monaural code included in the first code string input from the first communication line and an extended code having the closest frame number to that of the monaural code among extended codes included in the second code string input from the second communication line, and
      if the average value is not less than the time limit Tmax in the determination, for a frame after the determination, outputting the monaural code included in the first code string input from the first communication line; and
   a decoding step of, if the average value is less than the time limit Tmax in the determination, for a frame after the determination, obtaining and outputting decoded digital sound signals of C (C being an integer that is at least 2) channels based on the monaural code output in the reception step and the extended code output in the reception step, and
      if the average value is not less than the time limit Tmax in the determination, for a frame after the determination, outputting decoded digital sound signals obtained based on the monaural code output in the reception step as the decoded digital sound signals of C channels.

3. A sound signal receiving and decoding method to be performed by a terminal apparatus connected to a first communication line and a second communication line with a lower priority level than the first communication line, the method comprising:
   a reception step of determining whether an average value, for a plurality of sets each composed of a first code string received from the first communication line and a second code string received from the second communication line corresponding to the first code string, of a difference between times at which the first code string and the second code string were received for each set is less than a predetermined first time limit Tmin, is at least a predetermined second time limit Tmax that is greater than the first time limit Tmin, or is at least the first time limit Tmin and less than the second time limit Tmax,
      if the average value is less than the first time limit Tmin in the determination, for a frame after the determination, outputting a monaural code included in the first code string input from the first communication line and an extended code having the same frame number as the monaural code among extended codes included in the second code string input from the second communication line,
      if the average value is at least the first time limit Tmin and less than the second time limit Tmax in the determination, for a frame after the determination, outputting the monaural code included in the first code string input from the first communication line and an extended code with the closest frame number to that of the monaural code among the extended codes included in the second code string input from the second communication line, and
      if the average value is at least the second time limit Tmax in the determination, for a frame after the determination, outputting the monaural code included in the first code string input from the first communication line; and
   a decoding step of, if the average value is less than the first time limit Tmin in the determination, or if the average value is at least the first time limit Tmin and less than the second time limit Tmax in the determination, for a frame after the determination, obtaining and outputting decoded digital sound signals of C (C being an integer that is at least 2) channels based on the monaural code output in the reception step and the extended code output in the reception step, and
      if the average value is at least the second time limit Tmax in the determination, for a frame after the determination, outputting decoded digital sound signals obtained based on the monaural code output in the reception step as the decoded digital sound signals of C channels.

4. A sound signal receiving and decoding method to be performed by a terminal apparatus connected to a first communication line and a second communication line with a lower priority level than the first communication line, the method comprising:
   a reception step of, for a frame in which a difference in frame number between a monaural code included in a first code string input from the first communication line and an extended code with the closest frame number to that of the monaural code among extended codes included in a second code string input from the second communication line is less than a predetermined value, outputting the monaural code included in the first code string input from the first communication line and the extended code with the closest frame number to that of the monaural code among the extended codes included in the second code string input from the second communication line, and
      for a frame in which the difference is not less than the predetermined value, outputting the monaural code included in the first code string input from the first communication line; and
   a decoding step of, for a frame in which the difference is less than the predetermined value, obtaining and outputting decoded digital sound signals of C (C being an integer that is at least 2) channels based on the monaural code output in the reception step and the extended code output in the reception step, and
      for a frame in which the difference is not less than the predetermined value, outputting decoded digital sound signals obtained based on the monaural code output in the reception step as the decoded digital sound signals of C channels.

5. A sound signal decoding method to be performed by a terminal apparatus connected to a first communication line and a second communication line with a lower priority level than the first communication line, the method comprising:
  a decoding step of, if an average value, for a plurality of sets each composed of a first code string received from the first communication line and a second code string received from the second communication line corresponding to the first code string, of a difference between times at which the first code string and the second code string were received for each set is less than a predetermined time limit Tmin, obtaining and outputting decoded digital sound signals of C (C being an integer that is at least 2) channels based on a monaural code included in the first code string input from the first communication line and an extended code that is included in the second code string input from the second communication line and has the same frame number as the monaural code, and
    if the average value is not less than the time limit Tmin, obtaining and outputting the decoded digital sound signals of C channels based on the monaural code included in the first code string input from the first communication line and an extended code that is included in the second code string input from the second communication line and has the closest frame number to that of the monaural code.

6. A sound signal decoding method to be performed by a terminal apparatus connected to a first communication line and a second communication line with a lower priority level than the first communication line, the method comprising:
  a decoding step of, if an average value, for a plurality of sets each composed of a first code string received from the first communication line and a second code string received from the second communication line corresponding to the first code string, of a difference between times at which the first code string and the second code string were received for each set is less than a predetermined time limit Tmax, obtaining and outputting decoded digital sound signals of C (C being an integer that is at least 2) channels based on a monaural code included in the first code string input from the first communication line and an extended code that is included in the second code string input from the second communication line and has the closest frame number to that of the monaural code, and
    if the average value is not less than the time limit Tmax, outputting decoded digital sound signals obtained based on the monaural code included in the first code string input from the first communication line as the decoded digital sound signals of C channels.

7. A sound signal decoding method to be performed by a terminal apparatus connected to a first communication line and a second communication line with a lower priority level than the first communication line, the method comprising:
  a decoding step of, if an average value, for a plurality of sets each composed of a first code string received from the first communication line and a second code string received from the second communication line corresponding to the first code string, of a difference between times at which the first code string and the second code string were received for each set is less than a predetermined first time limit Tmin, obtaining and outputting decoded digital sound signals of C (C being an integer that is at least 2) channels based on a monaural code included in the first code string input from the first communication line and an extended code that is included in the second code string input from the second communication line and has the same frame number as the monaural code,
    if the average value is at least a predetermined second time limit Tmax that is greater than the first time limit Tmin, outputting decoded digital sound signals obtained based on the monaural code included in the first code string input from the first communication line as the decoded digital sound signals of C channels, and
    if the average value is at least the first time limit Tmin and less than the second time limit Tmax, obtaining and outputting the decoded digital sound signals of C channels based on the monaural code included in the first code string input from the first communication line and an extended code that is included in the second code string input from the second communication line and has the closest frame number to that of the monaural code.

8. A sound signal decoding method to be performed by a terminal apparatus connected to a first communication line and a second communication line with a lower priority level than the first communication line, the method comprising:
  a decoding step of, for a frame in which a difference in frame number between a monaural code included in a first code string input from the first communication line and an extended code that is included in a second code string input from the second communication line and has the closest frame number to that of the monaural code is less than a predetermined value, obtaining and outputting decoded digital sound signals of C (C being an integer that is at least 2) channels based on the monaural code and the extended code, and
    for a frame in which the difference is not less than the predetermined value, outputting decoded digital sound signals obtained based on the monaural code as the decoded digital sound signals of C channels.

9. A sound signal receiving side apparatus included in a terminal apparatus connected to a first communication line and a second communication line with a lower priority level than the first communication line, the sound signal receiving side apparatus comprising:
  processing circuitry configured to: execute a reception processing configured to determine whether or not an average value, for a plurality of sets each composed of a first code string received from the first communication line and a second code string received from the second communication line corresponding to the first code string, of a difference between times at which the first code string and the second code string were received for each set is less than a predetermined time limit Tmin,
    if the average value is less than the time limit Tmin in the determination, for a frame after the determination, output a monaural code included in the first code string input from the first communication line and an extended code having the same frame number as the monaural code among extended codes included in the second code string input from the second communication line, and
    if the average value is not less than the time limit Tmin in the determination, for a frame after the determination, output the monaural code included in the first code string input from the first communication line and an extended code having the closest frame number to that of the monaural code among the extended codes included in the second code string input from the second communication line; and a decoding processing configured to, for a frame after the determination, obtain and output decoded digital sound signals of C (C being an integer that is at least 2) channels based on the monaural code output by the reception processing and the extended code output by the reception processing.

10. A sound signal receiving side apparatus included in a terminal apparatus connected to a first communication line and a second communication line with a lower priority level than the first communication line, the sound signal receiving side apparatus comprising:
processing circuitry configured to: execute a reception processing configured to determine whether or not an average value, for a plurality of sets each composed of a first code string received from the first communication line and a second code string received from the second communication line corresponding to the first code string, of a difference between times at which the first code string and the second code string were received for each set is less than a predetermined time limit Tmax,
if the average value is less than the time limit Tmax in the determination, for a frame after the determination, output a monaural code included in the first code string input from the first communication line and an extended code having the closest frame number to that of the monaural code among extended codes included in the second code string input from the second communication line, and
if the average value is not less than the time limit Tmax in the determination, for a frame after the determination, output the monaural code included in the first code string input from the first communication line; and
a decoding processing configured to, if the average value is less than the time limit Tmax in the determination, for a frame after the determination, obtain and output a decoded digital sound signal of C (C being an integer that is at least 2) channels based on the monaural code output by the reception processing and the extended code output by the reception processing, and
if the average value is not less than the time limit Tmax in the determination, for a frame after the determination, output decoded digital sound signals obtained based on the monaural code output by the reception processing as the decoded digital sound signals of C channels.

11. A sound signal receiving side apparatus included in a terminal apparatus connected to a first communication line and a second communication line with a lower priority level than the first communication line, the sound signal receiving side apparatus comprising:
processing circuitry configured to: execute a reception processing configured to determine whether an average value, for a plurality of sets each composed of a first code string received from the first communication line and a second code string received from the second communication line corresponding to the first code string, of a difference between times at which the first code string and the second code string were received for each set is less than a predetermined first time limit Tmin, is at least a predetermined second time limit Tmax that is greater than the first time limit Tmin, or is at least the first time limit Tmin and less than the second time limit Tmax,
if the average value is less than the first time limit Tmin in the determination, for a frame after the determination, output a monaural code included in the first code string input from the first communication line and an extended code having the same frame number as the monaural code among extended codes included in the second code string input from the second communication line,
if the average value is at least the first time limit Tmin and less than the second time limit Tmax in the determination, for a frame after the determination, output the monaural code included in the first code string input from the first communication line and an extended code with the closest frame number to that of the monaural code among the extended codes included in the second code string input from the second communication line, and
if the average value is at least the second time limit Tmax in the determination, for a frame after the determination, output the monaural code included in the first code string input from the first communication line; and
a decoding processing configured to, if the average value is less than the first time limit Tmin in the determination, or if the average value is at least the first time limit Tmin and less than the second time limit Tmax in the determination, for a frame after the determination, obtain and output decoded digital sound signals of C (C being an integer that is at least 2) channels based on the monaural code output by the reception processing and the extended code output by the reception processing, and
if the average value is at least the second time limit Tmax in the determination, for a frame after the determination, output decoded digital sound signals obtained based on the monaural code output by the reception processing as the decoded digital sound signals of C channels.

12. A sound signal receiving side apparatus included in a terminal apparatus connected to a first communication line and a second communication line with a lower priority level than the first communication line, the sound signal receiving side apparatus comprising:
processing circuitry configured to: execute a reception processing configured to, for a frame in which a difference in frame number between a monaural code included in a first code string input from the first communication line and an extended code with the closest frame number to that of the monaural code among extended codes included in a second code string input from the second communication line is less than a predetermined value, output the monaural code included in the first code string input from the first communication line and the extended code with the closest frame number to that of the monaural code among the extended codes included in the second code string input from the second communication line, and for a frame in which the difference is not less than the predetermined value, output the monaural code included in the first code string input from the first communication line; and
a decoding processing configured to, for a frame in which the difference is less than the predetermined value, obtain and output decoded digital sound signals of C (C being an integer that is at least 2) channels based on the monaural code output by the reception processing and the extended code output by the reception processing, and for a frame in which the difference is not less than the predetermined value, output decoded digital sound signals obtained based on the monaural code output by the reception processing as the decoded digital sound signals of C channels.

13. A decoding apparatus included in a terminal apparatus connected to a first communication line and a second communication line with a lower priority level than the first communication line, the decoding apparatus comprising:
processing circuitry configured to: execute a decoding processing configured to, if an average value, for a plurality of sets each composed of a first code string received from the first communication line and a second code string received from the second communication line corresponding to the first code string, of a difference between times at which the first code string and the second code string were received for each set is less than a predetermined time limit Tmin, obtain and output decoded digital sound signals of C (C being an integer that is at least 2) channels based on a monaural code included in the first code string input from the first communication line and an extended code that is included in the second code string input from the second communication line and has the same frame number as the monaural code, and
if the average value is not less than the time limit Tmin, obtain and output the decoded digital sound signals of C channels based on the monaural code included in the first code string input from the first communication line and an extended code that is included in the second code string input from the second communication line and has the closest frame number to that of the monaural code.

14. A decoding apparatus included in a terminal apparatus connected to a first communication line and a second communication line with a lower priority level than the first communication line, the decoding apparatus comprising:
processing circuitry configured to: execute a decoding processing configured to, if an average value, for a plurality of sets each composed of a first code string received from the first communication line and a second code string received from the second communication line corresponding to the first code string, of a difference between times at which the first code string and the second code string were received for each set is less than a predetermined time limit Tmax, obtain and output decoded digital sound signals of C (C being an integer that is at least 2) channels based on a monaural code included in the first code string input from the first communication line and an extended code that is included in the second code string input from the second communication line and has the closest frame number to that of the monaural code, and
if the average value is not less than the time limit Tmax, output decoded digital sound signals obtained based on the monaural code included in the first code string input from the first communication line as the decoded digital sound signals of C channels.

15. A decoding apparatus included in a terminal apparatus connected to a first communication line and a second communication line with a lower priority level than the first communication line, the decoding apparatus comprising:
a decoding processing configured to, if an average value, for a plurality of sets each composed of a first code string received from the first communication line and a second code string received from the second communication line corresponding to the first code string, of a difference between times at which the first code string and the second code string were received for each set is less than a predetermined first time limit Tmin, obtain and output decoded digital sound signals of C (C being an integer that is at least 2) channels based on a monaural code included in the first code string input from the first communication line and an extended code that is included in the second code string input from the second communication line and has the same frame number as the monaural code,
if the average value is at least a predetermined second time limit Tmax that is greater than the first time limit Tmin, output decoded digital sound signals obtained based on the monaural code included in the first code string input from the first communication line as the decoded digital sound signals of C channels, and
if the average value is at least the first time limit Tmin and less than the second time limit Tmax, obtain and output the decoded digital sound signals of C channels based on the monaural code included in the first code string input from the first communication line and an extended code that is included in the second code string input from the second communication line and has the closest frame number to that of the monaural code.

16. A decoding apparatus included in a terminal apparatus connected to a first communication line and a second communication line with a lower priority level than the first communication line, the decoding apparatus comprising:
a decoding processing configured to, for a frame in which a difference in frame number between a monaural code included in a first code string input from the first communication line and an extended code that is included in the second code string input from the second communication line and has the closest frame number to that of the monaural code is less than a predetermined value, obtain and output decoded digital sound signals of C (C being an integer that is at least 2) channels based on the monaural code and the extended code, and
for a frame in which the difference is not less than the predetermined value, output decoded digital sound signals obtained based on the monaural code as the decoded digital sound signals of C channels.

17. A non-transitory computer-readable storage medium storing a program for causing a computer to execute the sound signal receiving and decoding method according to claim 1.

18. A non-transitory computer-readable storage medium storing a program for causing a computer to execute the sound signal decoding method according to claim 5.

19. A non-transitory computer-readable storage medium storing a program for causing a computer to execute the sound signal receiving and decoding method according to claim 2.

20. A non-transitory computer-readable storage medium storing a program for causing a computer to execute the sound signal receiving and decoding method according to claim 3.

21. A non-transitory computer-readable storage medium storing a program for causing a computer to execute the sound signal receiving and decoding method according to claim 4.

22. A non-transitory computer-readable storage medium storing a program for causing a computer to execute the sound signal decoding method according to claim 6.

23. A non-transitory computer-readable storage medium storing a program for causing a computer to execute the sound signal decoding method according to claim 7.

24. A non-transitory computer-readable storage medium storing a program for causing a computer to execute the sound signal decoding method according to claim 8.

* * * * *